US010608250B2

(12) United States Patent
Ise et al.

(10) Patent No.: US 10,608,250 B2
(45) Date of Patent: Mar. 31, 2020

(54) ACTIVE MATERIAL, ACTIVE MATERIAL COMPOSITE MATERIAL, ELECTRODE, SECONDARY BATTERY, BATTERY PACK, AND VEHICLE

(71) Applicant: KABUSHIKI KAISHA TOSHIBA, Minato-ku (JP)

(72) Inventors: Kazuki Ise, Kawasaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 181 days.

(21) Appl. No.: 15/899,951

(22) Filed: Feb. 20, 2018

(65) Prior Publication Data
US 2019/0088942 A1 Mar. 21, 2019

(30) Foreign Application Priority Data

Sep. 20, 2017 (JP) .................................. 2017-179939

(51) Int. Cl.
| H01M 4/485 | (2010.01) |
| H01M 10/0525 | (2010.01) |
| H01M 10/44 | (2006.01) |
| C01G 23/00 | (2006.01) |
| C01G 33/00 | (2006.01) |
| H01M 10/052 | (2010.01) |

(52) U.S. Cl.
CPC .......... *H01M 4/485* (2013.01); *C01G 23/002* (2013.01); *C01G 33/006* (2013.01); *H01M 10/0525* (2013.01); *H01M 10/44* (2013.01); *H01M 10/052* (2013.01); *H01M 2220/20* (2013.01)

(58) Field of Classification Search
None
See application file for complete search history.

(56) References Cited

U.S. PATENT DOCUMENTS

| 2012/0009449 A1 | 1/2012 | Inagaki et al. |
| 2012/0107692 A1 | 5/2012 | Harada et al. |
| 2012/0129016 A1 | 5/2012 | Inagaki et al. |

(Continued)

FOREIGN PATENT DOCUMENTS

| JP | 2011-154928 | 8/2011 |
| JP | 2015-084321 | 4/2015 |

(Continued)

OTHER PUBLICATIONS

Yu et al. "Dual modification of TiNb2O7 with nitrogen dopants and oxygen vacancies for selective aerobic oxidation of benzylamine to imine under green light". Royal Society of Chemistry. Jan. 26, 2017 (p. 4607-4615). (Year: 2017).*

(Continued)

*Primary Examiner* — Christopher P Domone
(74) *Attorney, Agent, or Firm* — Oblon, McClelland, Maier & Neustadt, L.L.P.

(57) ABSTRACT

According to one embodiment, an active material is provided. The active material includes particles. The particles have a crystal structure belonging to a monoclinic niobium-titanium composite oxide. A ratio of a crystallite size Dc corresponding to a (020) plane with respect to an average primary particle size Dp of the particles is not less than 35%.

14 Claims, 14 Drawing Sheets

(56) References Cited

U.S. PATENT DOCUMENTS

| | | | |
|---|---|---|---|
| 2014/0295231 A1* | 10/2014 | Ise | H01M 10/482 429/90 |
| 2015/0086872 A1 | 3/2015 | Ise et al. | |
| 2015/0243979 A1* | 8/2015 | Nakahara | C01G 33/00 429/231.1 |
| 2016/0276662 A1 | 9/2016 | Ise et al. | |

FOREIGN PATENT DOCUMENTS

| | | |
|---|---|---|
| JP | 2016 171011 | 9/2016 |
| JP | 2016-177972 | 10/2016 |
| JP | 6076928 | 2/2017 |
| WO | 2016 084200 | 6/2016 |

OTHER PUBLICATIONS

Daramalla et al. "Fabrication of TiNb2O7 thin film electrodes for Li-ion micro-batteries by pulsed laser deposition". Materials Science and Engineering B. Apr. 23, 2016 (p. 90-97). (Year: 2016).*

Jian-Tao Han, et al., "New Anode Framework for Rechargeable Lithium Batteries," Chemistry of Materials, vol. 23, No. 8, 2011, pp. 2027-2029.

* cited by examiner

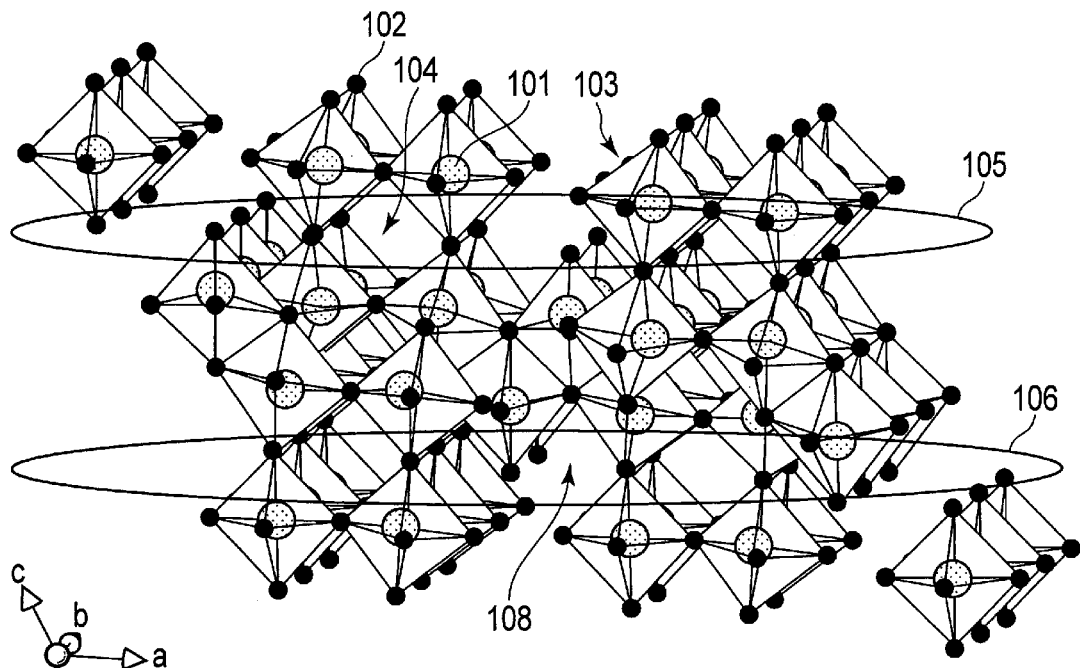
F I G. 1
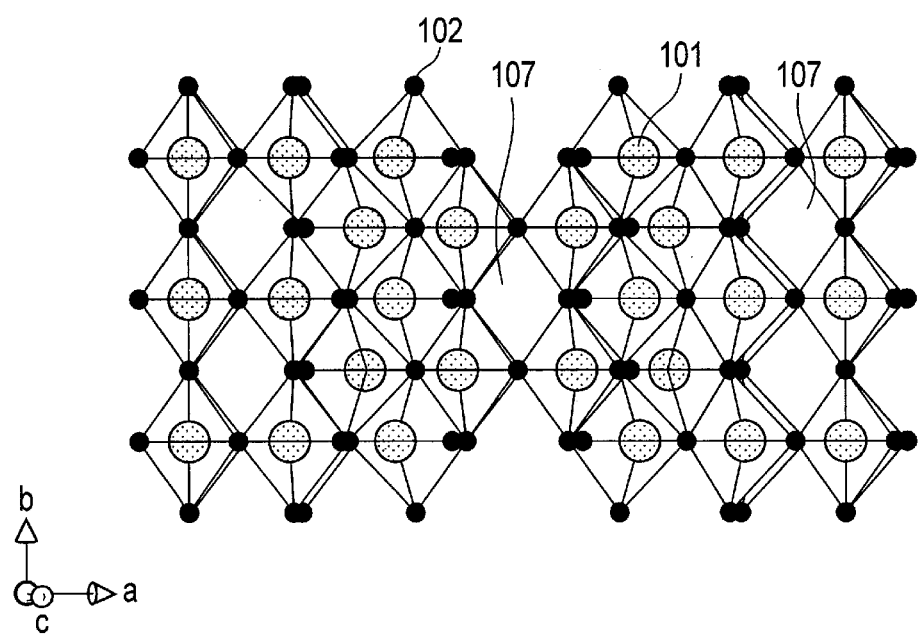
F I G. 2

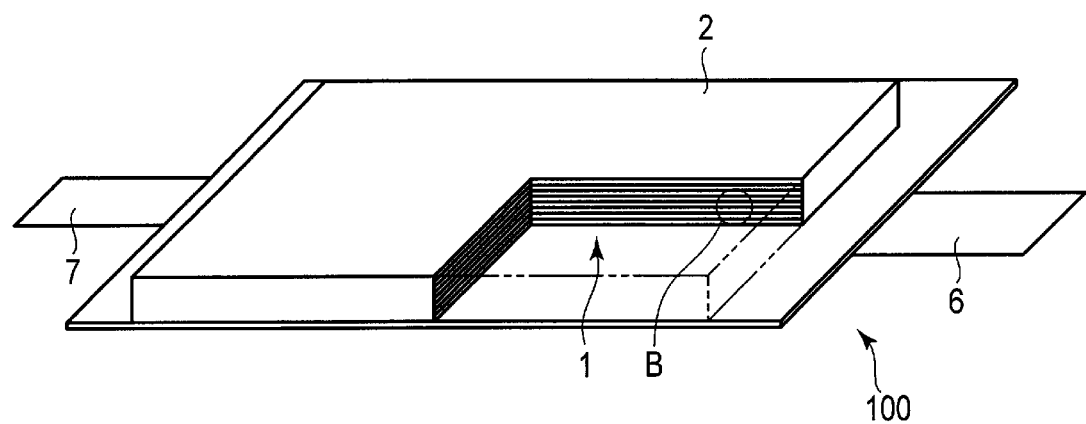
F I G. 6
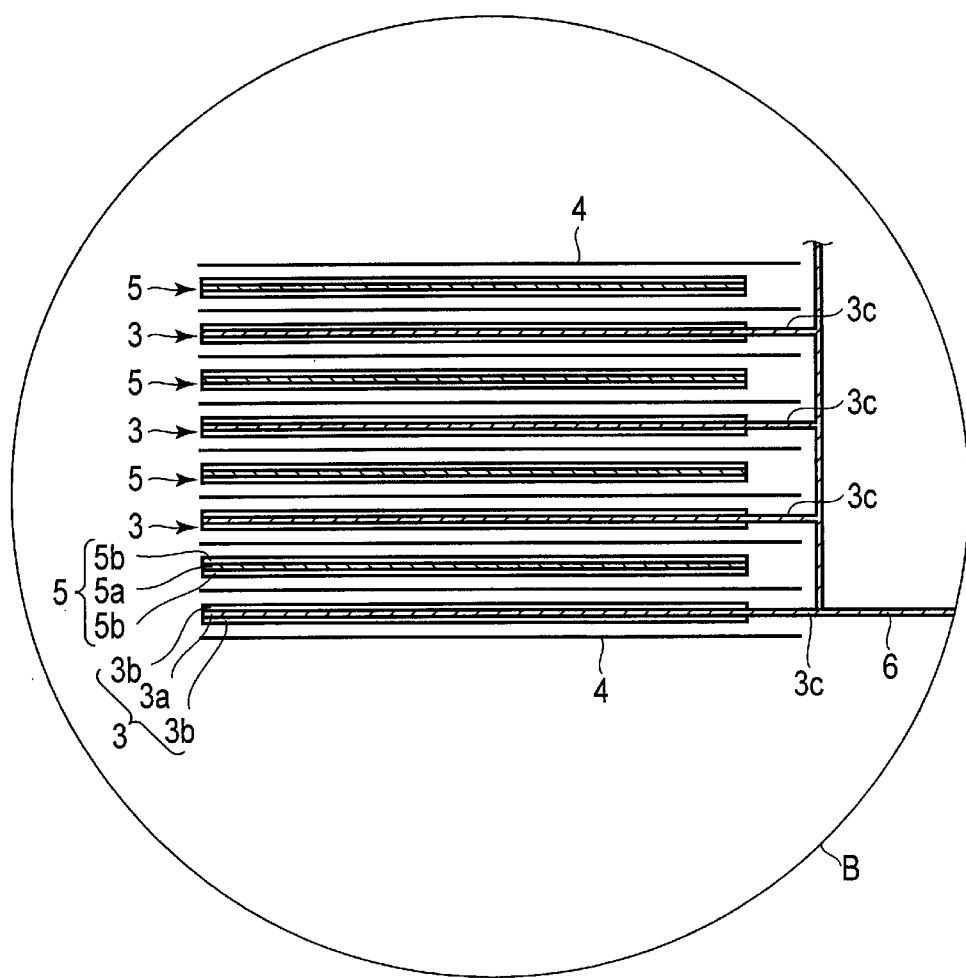
F I G. 7

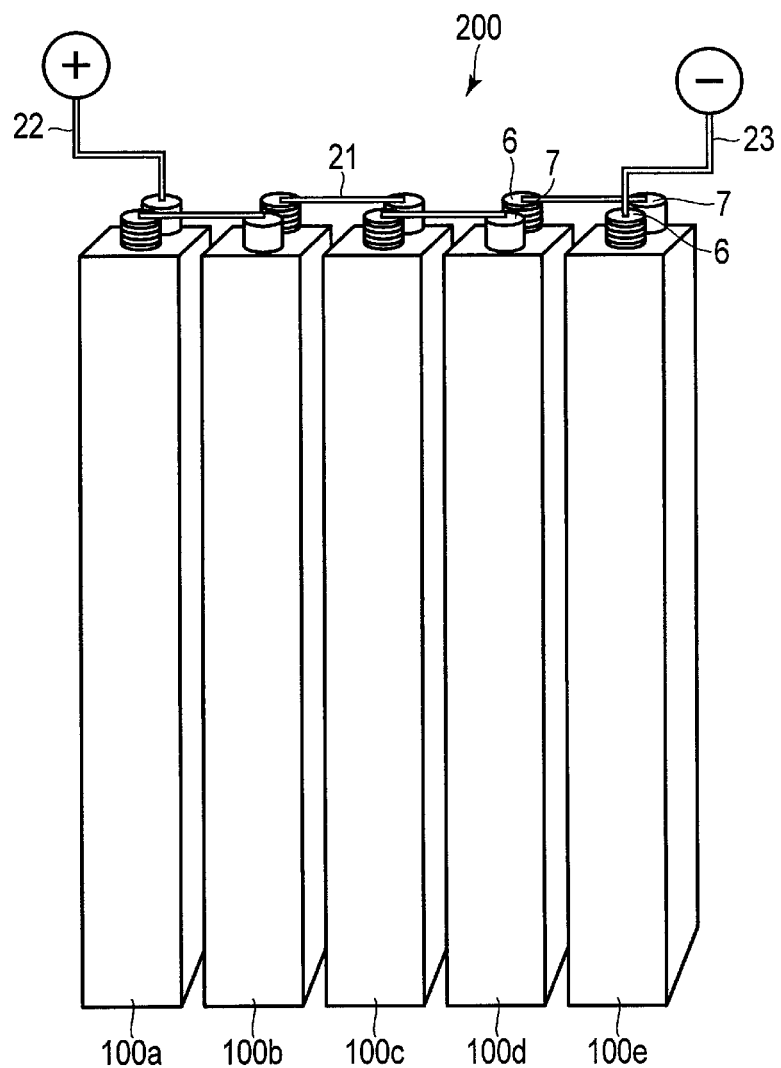
F I G. 8

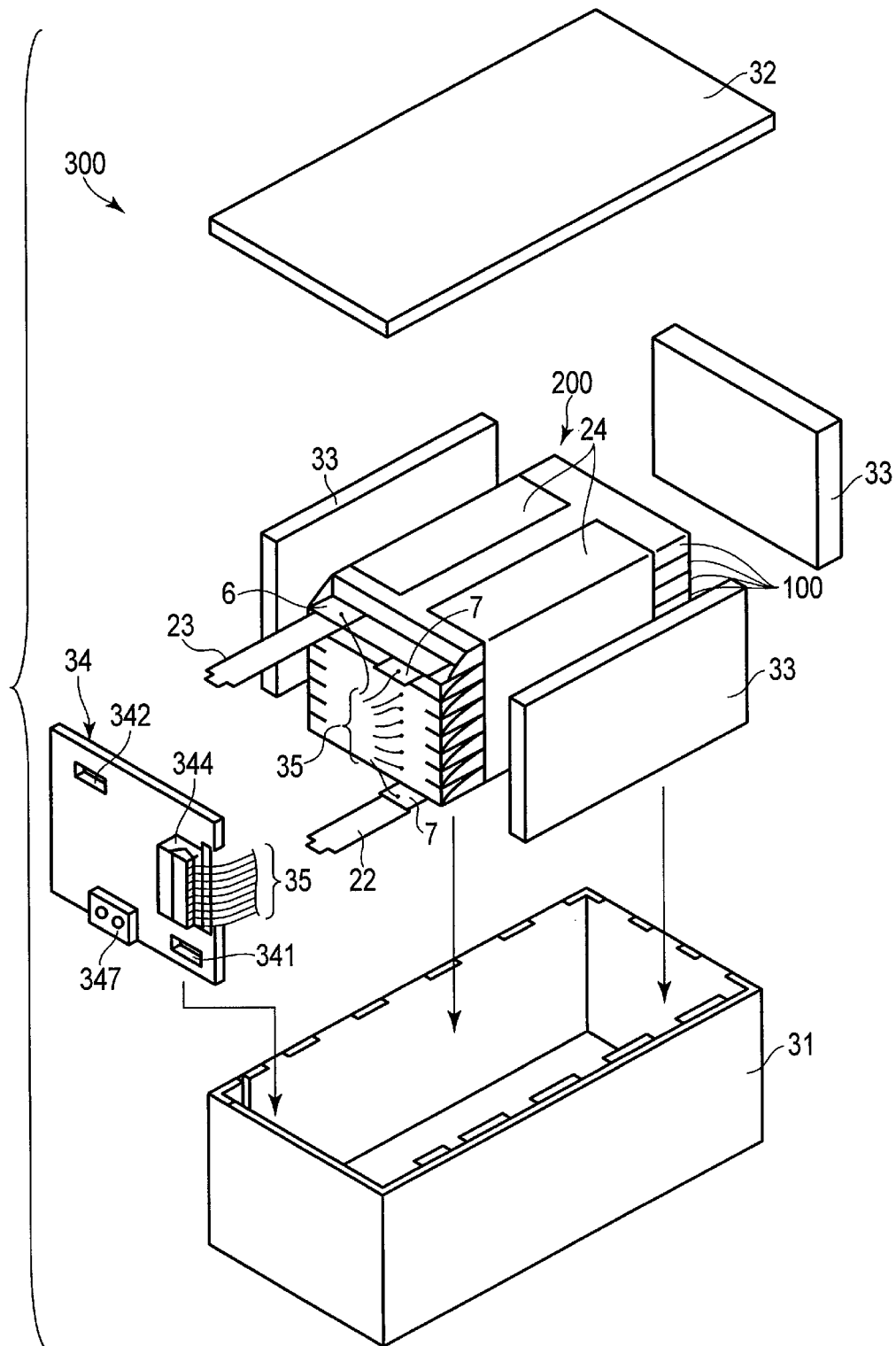
F I G. 9

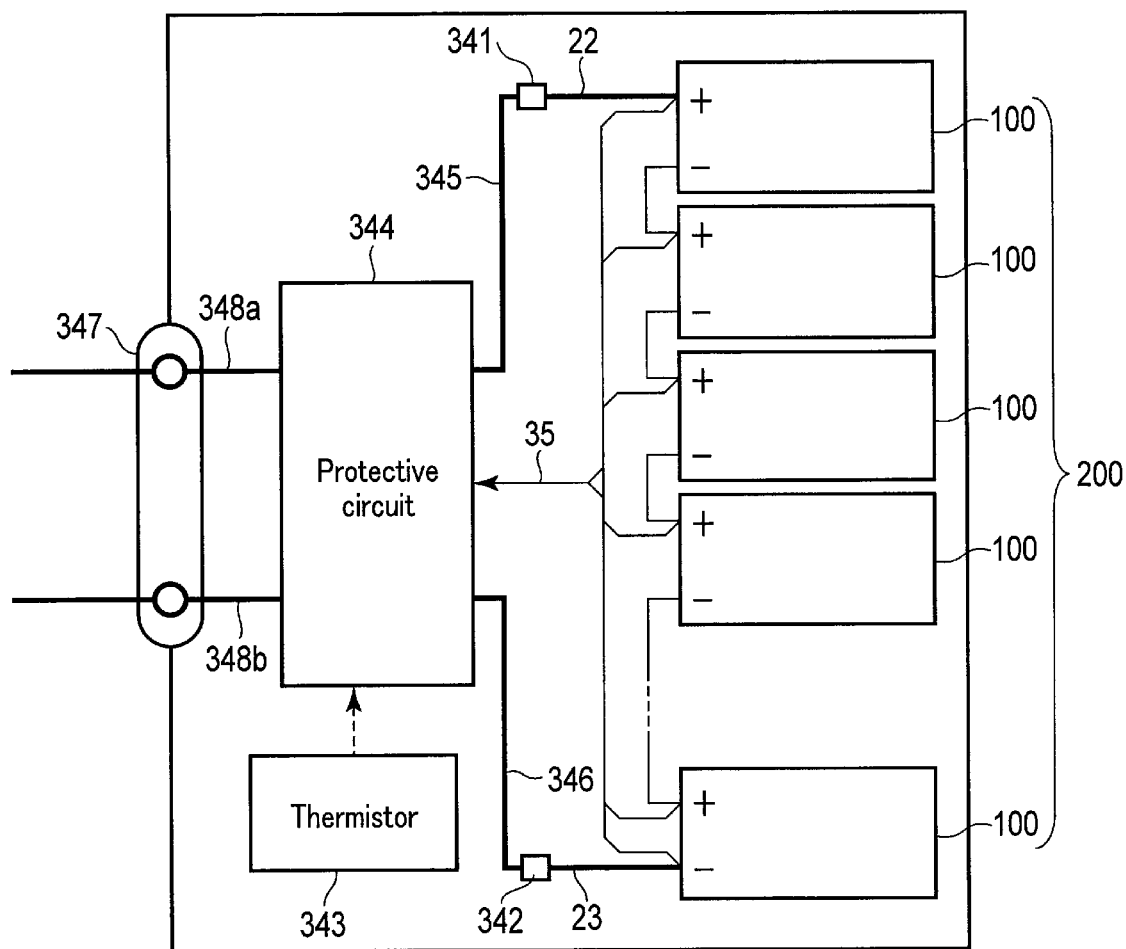
F I G. 10
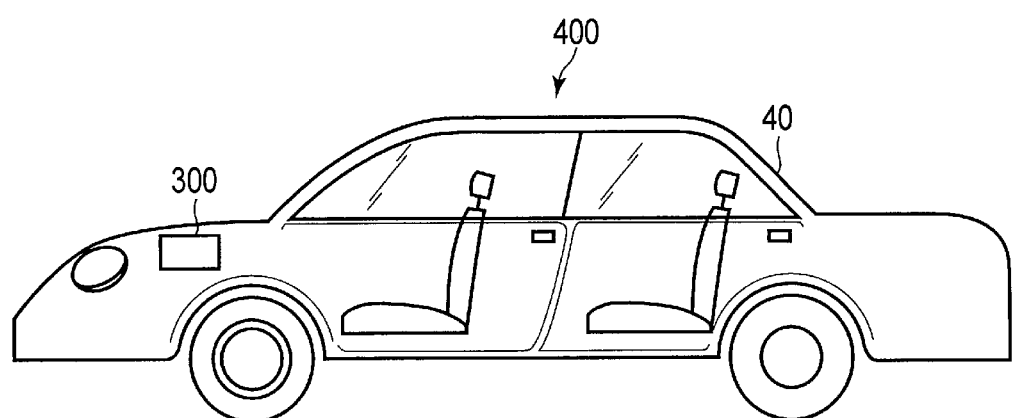
F I G. 11

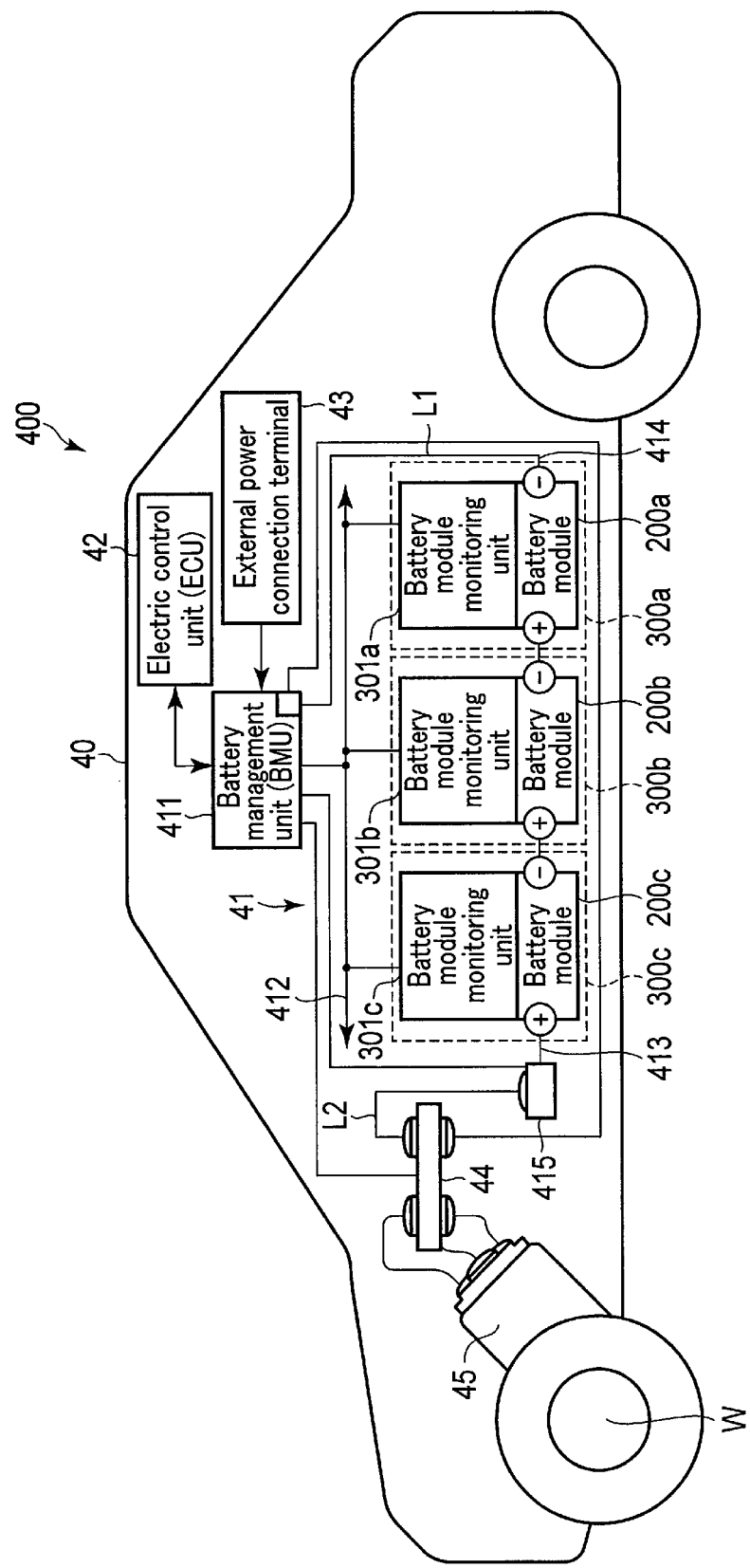
F I G. 12

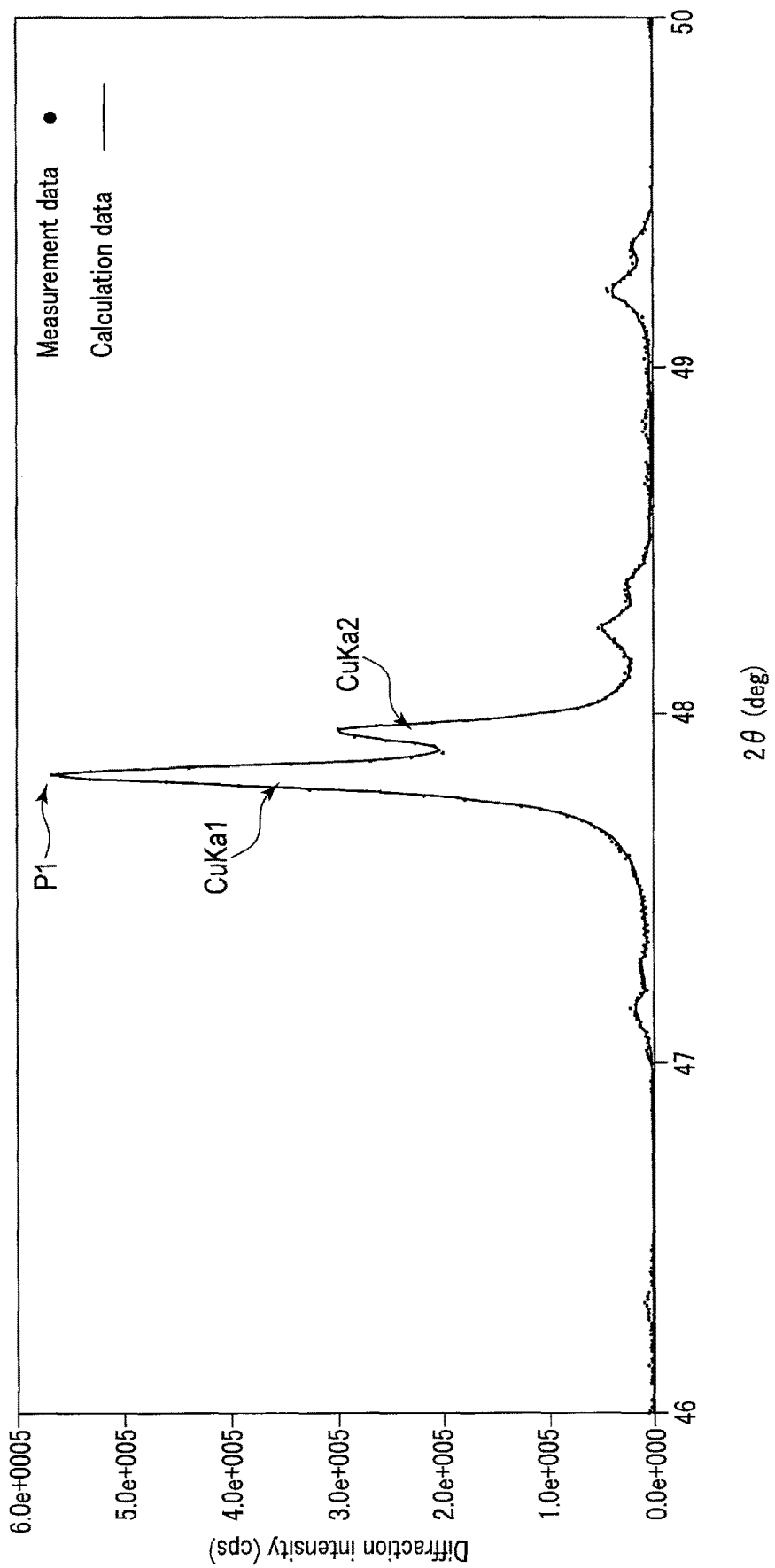
F I G. 15

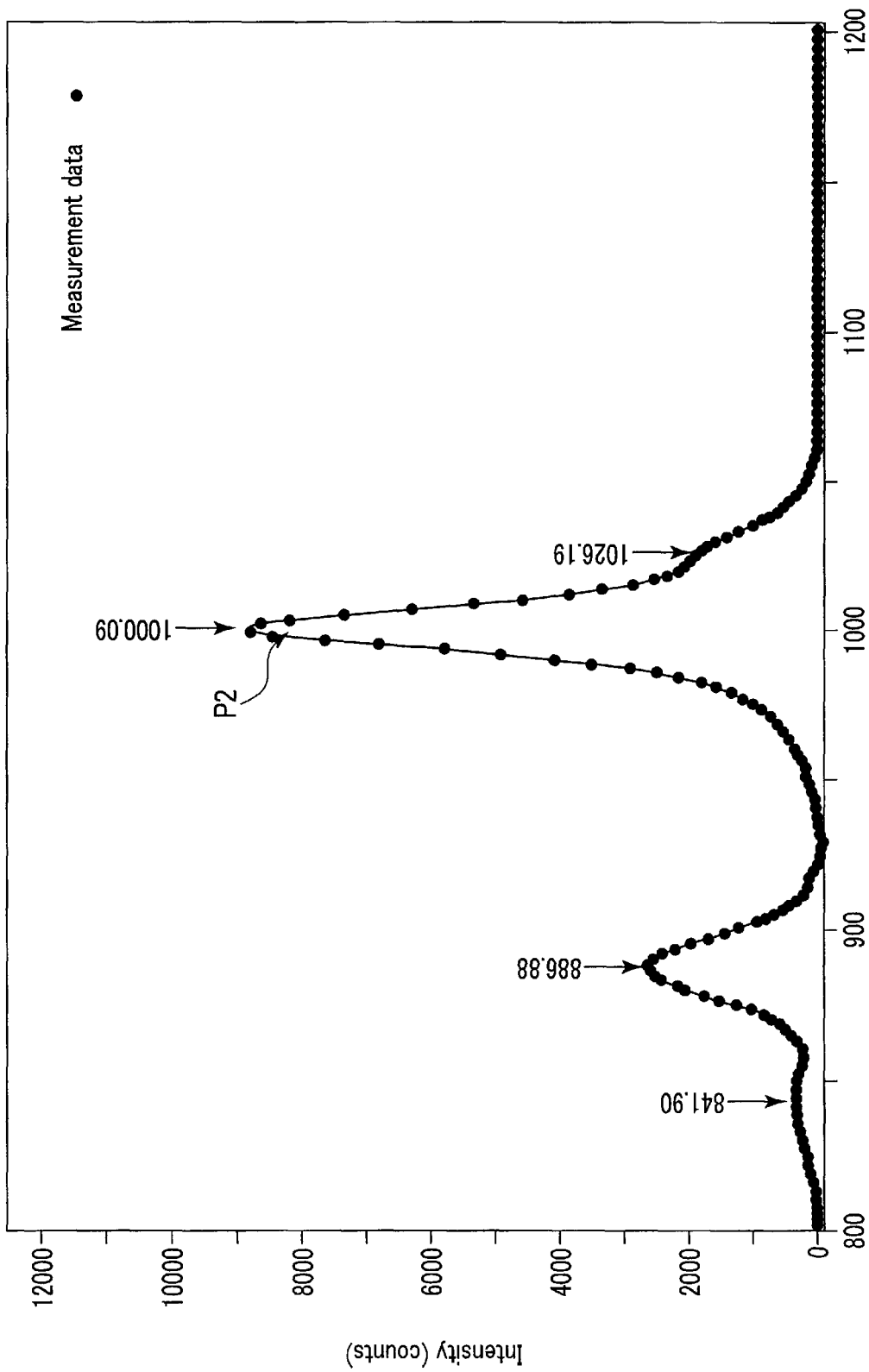
F I G. 16

ACTIVE MATERIAL, ACTIVE MATERIAL COMPOSITE MATERIAL, ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2017-179939, filed Sep. 20, 2017, the entire contents of which are incorporated herein by reference.

FIELD

Embodiments described herein relate generally to an active material, an active material composite material, an electrode, a secondary battery, a battery pack, and a vehicle.

BACKGROUND

In recent years, a secondary battery such as a lithium-ion secondary battery or a nonaqueous electrolyte secondary battery has been developed as a battery having a high energy density. The secondary battery is expected to be used as a power source for vehicles such as a hybrid automobile and an electric automobile, or as a large-sized power source for power storage. When the secondary battery is used as the power source for vehicles, the secondary battery is required to achieve rapid charge-and-discharge performance and long-term reliability or the like in addition to the high energy density.

Lithium ions and electrons rapidly move through an electrolyte and an external circuit respectively between a positive electrode and a negative electrode which can allow the lithium ions and the electrons to be inserted and extracted, to enable to perform rapid charge-and-discharge. The battery capable of performing rapid charge-and-discharge has the advantage that a charging time is considerably short. When the battery capable of performing rapid charge-and-discharge is used as the power source for vehicles, the motive performances of the automobile can be improved, and the regenerative energy of power can be efficiently recovered.

A carbon-based negative electrode using a carbonaceous material such as graphite as a negative electrode active material is used as a negative electrode which can allow the lithium ions and the electrons to be inserted and extracted. However, when rapid charge-and-discharge is repeated in a battery including the carbon-based negative electrode, dendrites of metal lithium may precipitate on the negative electrode. The dendrites of metal lithium may cause an internal short circuit. Therefore, when the rapid charge-and-discharge is repeated in the battery including the carbon-based negative electrode, a concern is raised that heat generation and ignition may occur.

Therefore, a battery including a negative electrode using a metal composite oxide as the negative electrode active material in place of the carbonaceous material has been developed. In particular, in a battery using a titanium oxide of the metal composite oxide as the negative electrode active material, the dendrites of metal lithium are less likely to precipitate even when rapid charge-and-discharge is repeated as compared with those of the battery including the carbon-based negative electrode. The battery using the titanium oxide has more stable rapid charge-and-discharge and a longer life than those of the battery including the carbon-based negative electrode.

However, the titanium oxide has a higher (nobler) potential relative to lithium metal than that of the carbonaceous material. In addition, the titanium oxide has a lower theoretical capacity per unit mass than that of the carbonaceous material. For this, there is a problem that the battery including a negative electrode using the titanium oxide as the negative electrode active material has a lower energy density than that of the battery including the carbon-based negative electrode.

For example, the potential relative to lithium metal of a lithium-titanium composite oxide such as $Li_4Ti_5O_{12}$ is about 1.5 V (vs. $Li^+/Li$) or more. On the other hand, the potential relative to lithium metal of graphite is about 0.1 V (vs. $Li^+/Li$) or more. Here, the potential relative to lithium metal of the titanium oxide is caused by an oxidation-reduction reaction occurring between trivalent titanium ions and tetravalent titanium ions when lithium ions are electrochemically inserted and extracted. That is, the potential relative to lithium metal of the titanium oxide is inherent to the titanium oxide, and the lowering of the potential is electrochemically limited. Therefore, it is substantially difficult to lower the potential relative to lithium metal of the titanium oxide to improve the energy density. Since the potential of the titanium oxide with respect to lithium metal is high, a battery including a negative electrode containing the titanium oxide allows stable rapid charge-and-discharge.

The theoretical capacity per unit mass of the lithium-titanium composite oxide such as $Li_4Ti_5O_{12}$ is 175 mAh/g. On the other hand, the theoretical capacity per unit mass of graphite is 372 mAh/g. Furthermore, the titanium oxide has less sites capable of allowing lithium ions to be inserted in its crystal structure than those of the carbonaceous material, and is likely to stabilize lithium ions in its crystal structure. Therefore, the ratio of the actual capacity of the titanium oxide to the theoretical capacity thereof is lower than the ratio of the actual capacity of the carbonaceous material to the theoretical capacity thereof.

From the above, the energy density of the battery including the negative electrode containing the titanium oxide is remarkably lower than that of the battery having the carbon-based negative electrode.

In view of the above, a new electrode material containing titanium and niobium has been studied. In particular, in a monoclinic niobium-titanium composite oxide represented by $TiNb_2O_7$, tetravalent titanium ions are reduced to trivalent titanium ions and pentavalent niobium ions are reduced to trivalent niobium ions when lithium ions are inserted. Therefore, this monoclinic niobium-titanium composite oxide can maintain the electric neutrality of a crystal structure even when many lithium ions are inserted, as compared with the titanium oxide. As a result, the monoclinic Nb—Ti composite oxide represented by $TiNb_2O_7$ has a high theoretical capacity of 387 mAh/g.

BRIEF DESCRIPTION OF THE DRAWINGS

FIG. 1 is a schematic view showing an example of the crystal structure of the monoclinic niobium titanium composite oxide;

FIG. 2 is a schematic view of the crystal structure shown in FIG. 1 as viewed from another direction;

FIG. 6 is a partially cut-out perspective view schematically showing another example of a secondary battery according to the third embodiment;

FIG. 7 is an enlarged cross-sectional view of section B of the secondary battery shown in FIG. 6;

FIG. 8 is a perspective view schematically showing an example of the battery module according to the fourth embodiment;

FIG. 9 is an exploded perspective view schematically showing an example of the battery pack according to the fifth embodiment;

FIG. 10 is a block diagram showing an example of an electric circuit of the battery pack shown in FIG. 9;

FIG. 11 is a cross-sectional view schematically showing an example of a vehicle according to the sixth embodiment;

FIG. 12 is a view schematically showing another example of the vehicle according to the sixth embodiment;

FIG. 15 is an XRD spectrum concerning the active material obtained in Comparative Example 8;

FIG. 16 is a Raman spectrum concerning the active material composite material obtained in Example 1;

DETAILED DESCRIPTION

Figure 3:
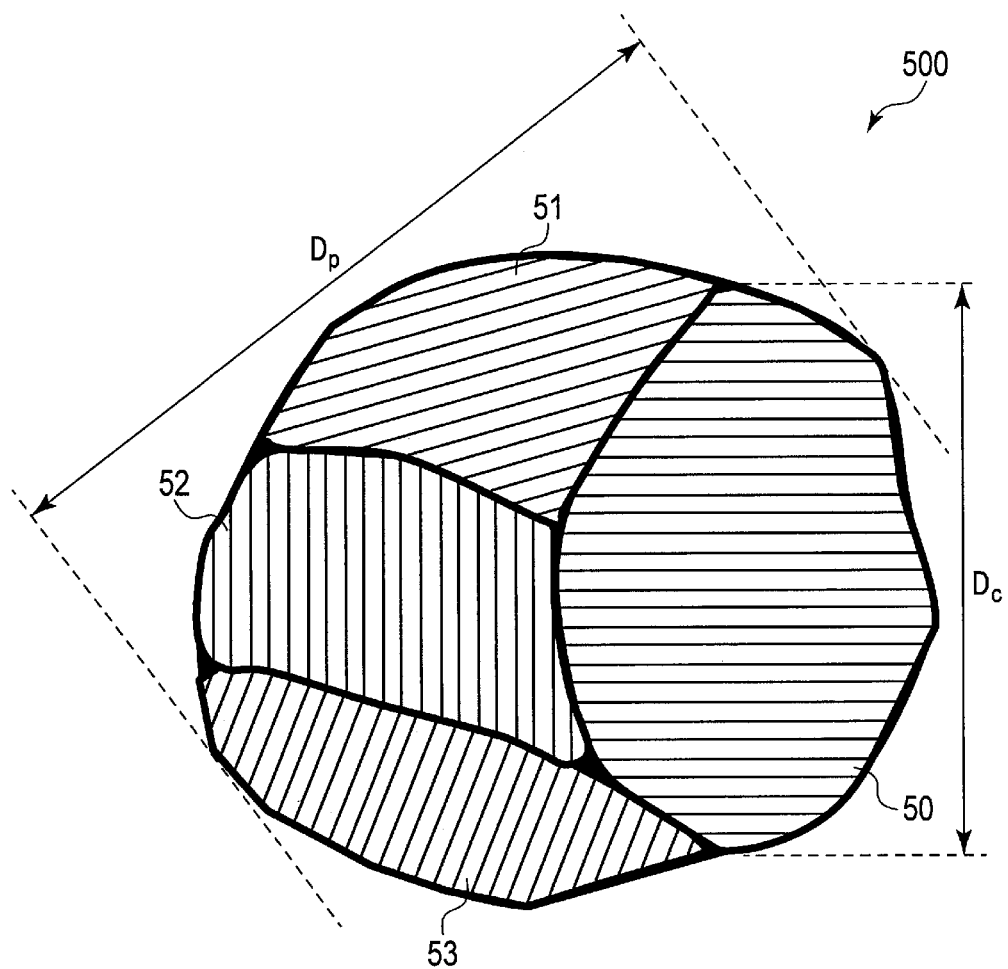
FIG. 3 is a sectional view schematically showing an example of a primary particle of the active material according to the first embodiment.

According to one embodiment, an active material is provided. The active material includes particles. The particles have a crystal structure belonging to a monoclinic niobium-titanium composite oxide. A ratio of a crystallite size Dc corresponding to a (020) plane with respect to an average primary particle size Dp of the particles is not less than 35%.

According to another embodiment, an active material composite material is provided. The active material composite material includes the active material according to the embodiment and a carbon body. The carbon body is supported on at least a portion of surfaces of the particles.

According to another embodiment, an electrode is provided. The electrode includes the active material according to the embodiment.

According to another embodiment, a secondary battery is provided. The secondary battery includes a negative electrode, a positive electrode, and an electrolyte. The negative electrode is the electrode according to the embodiment.

According to another embodiment, a battery pack is provided. The battery pack includes the secondary battery according to the embodiment.

According to another embodiment, a vehicle is provided. The vehicle includes the battery pack according to the embodiment.

As described above, the theoretical capacity of the monoclinic niobium-titanium composite oxide $TiNb_2O_7$ is 387 mAh/g. The theoretical capacity is a value obtained when 5 mol of lithium ions per formula weight are inserted. However, the chargeable/dischargeable capacity, that is, the reversible capacity of the monoclinic niobium-titanium composite oxide $TiNb_2O_7$ is amount 310 mAh/g at maximum, which is lower than the theoretical capacity. This is probably because only about 4 mol of lithium ions per formula weight are inserted in fact.

First Embodiment

According to the first embodiment, an active material is provided. The active material includes particles. The particles have a crystal structure belonging to a monoclinic niobium-titanium composite oxide. The ratio of a crystallite size Dc corresponding to a (020) plane with respect to an average primary particle size Dp of the particles is 35% or more.

In the XRD spectrum of the active material according to the first embodiment, a peak that appears within the incident angle range of 47.6° to 47.9° is a peak belonging to the plane index (020) in the crystal structure of the monoclinic niobium-titanium composite oxide. In the crystal structure of the monoclinic niobium-titanium composite oxide, the [020] direction is one of the diffusion directions of lithium ions. Hence, when the ratio of the crystallite size Dc corresponding to the (020) plane in the average primary particle size Dp is raised, the diffusibility of lithium ions in the crystal structure of the monoclinic niobium-titanium composite oxide can be increased. For this reason, in the active material according to the first embodiment, reactivity with lithium ions inside the primary particles is high, and insertion and extraction of lithium ions are quickly performed. As a result, the active material according to the first embodiment is excellent in charge-and-discharge cycle performance and can contain lithium ions of 4 mol or more per formula weight. Hence, a high reversible capacity can be implemented.

Details of the active material according to the first embodiment will be described below.

The active material according to the first embodiment can be an active material for a battery. The active material according to the first embodiment can be used as, for example, a negative electrode active material.

The active material according to the first embodiment is a monoclinic niobium-titanium composite oxide. The crystal structure of the monoclinic niobium-titanium composite oxide belongs to a space group C2/m. FIG. 1 is a schematic view showing an example of the crystal structure of the monoclinic niobium-titanium composite oxide. FIG. 2 is a schematic view of the crystal structure shown in FIG. 1 as viewed from another direction. FIGS. 1 and 2 shows the crystal structure of $TiNb_2O_7$ as an example of a monoclinic niobium-titanium composite oxide. Referring to FIGS. 1 and 2, an a-axis direction is a direction orthogonal to a b-axis direction, and a c-axis direction is a direction orthogonal to the b-axis direction.

As shown in FIGS. 1 and 2, the crystal structure of $TiNb_2O_7$ has a configuration in which metal ions 101 and oxide ions 102 constitute a skeleton structure portion 103. In each metal ions 101, niobium (Nb) ions and titanium (Ti) ions are arranged in the ratio of Nb to Ti of 2:1 at random. The skeleton structure portions 103 are alternately arranged three-dimensionally. Each of void portions 104 and 108 are provided among the skeleton structure portions 103. Each of the void portions 104 and 108 are hosts for lithium ions. The void portions 104 and 108 occupy a large portion with respect to the entire crystal structure as show in FIG. 1. In addition, the void portions 104 and 108 can maintain a structure stably even if lithium ions are inserted.

Each of regions 105 and 106 shown in FIG. 1 has a two-dimensional channel in the [100] direction, that is, the a-axis direction and the [010] direction ([020] direction), that is, the b-axis direction. As shown in FIG. 2, the crystal structure of $TiNb_2O_7$ has void portions 107. The void portion 107 has a tunnel structure which is suitable for conduction of lithium ions. The void portion 107 is connected to the region 105 and the region 106 as a conductive path. The presence of the conductive path allows the lithium ions to come and go between the region 105 and the region 106.

Additionally, as shown in FIG. 1, each of the void portions 104 and 108 has a tunnel structure in the b-axis direction, that is, the [010] direction. The void portions 104 and 108 occupy most part of the crystal structure of $TiNb_2O_7$ and can therefore be conductive paths to sufficiently quickly diffuse lithium ions. Hence, each of the void portions 104 and 108 can function as one of main conductive paths of lithium ions in the crystal structure of $TiNb_2O_7$, together with the void portions 107.

The crystal structure of the monoclinic niobium-titanium composite oxide shown in FIGS. 1 and 2 has a large space, into which the lithium ions are equivalently inserted, and has a structural stability. Additionally, in the crystal structure, a plurality of conductive paths to quickly diffuse lithium ions exist. Therefore, in the crystal structure of the monoclinic niobium-titanium composite oxide, the insertion properties of the lithium ions to the insertion space and the extraction properties of the lithium ions from the insertion space are improved, and the insertion-and-extraction space for the lithium ions is effectively increased. Accordingly, a high capacity and high rate performance can be implemented.

Furthermore, in the above-mentioned crystal structure, when a lithium ion is inserted into the void portion 104, the metal ion 101 constituting the skeleton structure portion 103 is reduced to trivalent, thereby maintaining the electrical neutrality of the crystal. In the monoclinic niobium-titanium composite oxide, not only the Ti ion is reduced from tetravalent to trivalent, but also the Nb ion is reduced from pentavalent to trivalent. For this, the number of reduced valences per active material weight is large. Therefore, even when a large number of lithium ions are inserted, the electrical neutrality of the crystal can be maintained. For this, the monoclinic niobium-titanium composite oxide has a higher energy density than that of a compound such as a titanium oxide containing only a tetravalent cation. Specifically, the theoretical capacity of the monoclinic niobium-titanium composite oxide is about 387 mAh/g, which is more than twice the value of a titanium oxide having a spinel structure.

The active material according to the first embodiment is in a form of, for example, particles. The active material can be single primary particles, secondary particles made of agglomerations of a plurality of primary particles, or a mixture thereof.

FIG. 3 is a sectional view schematically showing an example of a primary particle of the active material according to the first embodiment. A primary particle 500 shown in FIG. 3 includes a crystallite 50 corresponding to the (020) plane and other crystallites 51 to 53.

An average primary particle size Dp of the active material according to the first embodiment is preferably 350 nm or less, more preferably 325 nm or less, and much more preferably 150 nm or less. When the average primary particle size Dp of the active material is small, the diffusion distance of lithium ions in the primary particles tends to be short, and therefore, the lithium ion diffusibility tends to rise. Additionally, when the average primary particle size Dp of the active material is small, the reaction area tends to increase. Therefore the reactivity between the active material and the lithium ions tends to increase, and the lithium ion insertion/extraction reaction tends to improve.

On the other hand, if the average primary particle size Dp of the active material is excessively small, the reaction between the active material and the electrolyte increases, and the battery characteristic may lower. Hence, the average primary particle size Dp of the active material is preferably 10 nm or more.

The average primary particle size Dp of the active material can be calculated from a BET specific surface area S and a true density ρ. Equation (1) used to obtain the average primary particle size Dp is as follows. Note that the average primary particle size Dp is calculated by assuming that the primary particle has a spherical shape.

$$Dp=6000/(S \cdot \rho) \tag{1}$$

The true density ρ can be obtained by the following method. First, X-ray diffraction (XRD) measurement is performed for a sample, and an XRD diffraction pattern is acquired. A query is made to a database file (Powder Diffraction File: PDF) in the International Centre for Diffraction Data (ICDD) about the XRD diffraction pattern, and it is confirmed that the sample is a monoclinic niobium-titanium composite oxide of JCPDS #77-1374. The value of the true density ρ of the monoclinic niobium-titanium composite oxide, that is, 4.34 $g/cm^3$ can thus be obtained.

The BET specific surface area S means a specific surface area obtained by a nitrogen BET (Brunauer, Emmet and Teller) method. The specific surface area based on the nitrogen BET method can be obtained by the following method.

First, 4 g of the active material are collected as a sample. Next, the evaluation cell of a measuring apparatus is vacuum-dried at a temperature of 100° C. or more for 15 hrs to perform degassing. As the evaluation cell, for example, a ½-inch cell can be used. Next, the sample is placed in the measuring apparatus. As the measuring apparatus, for example, TriStar II 3020 available from Shimadzu-Micromeritics Instrument can be used. Then, in a nitrogen gas at 77K (the boiling point of nitrogen), while gradually increasing a pressure P (mmHg) of the nitrogen gas, the nitrogen gas adsorption amount (mL/g) of the sample is measured for each pressure P. Next, a value obtained by dividing the pressure P (mmHg) by a saturated vapor pressure $P_0$ (mmHg) of the nitrogen gas is defined as a relative pressure $P/P_0$, and a nitrogen gas adsorption amount corresponding to each relative pressure $P/P_0$ is plotted, thereby obtaining an adsorption isotherm. A BET plot is calculated from the nitrogen adsorption isotherm and the BET equation, and the specific surface area is obtained using the BET plot. Note that a BET multipoint method is used to calculate the BET plot.

Note that the active material according to the first embodiment can have a form of an active material composite material including a carbon body to be described later. In this case, the specific surface area of the active material is preferably measured in a state in which the carbon body is removed. This is because if a material such a carbon body is supported on the surface of the active material, it may influence the BET specific surface area of the active material. The carbon body can be removed from the active material by, for example, performing a heat treatment of a sample in air at a temperature of 400° C. to 700° C.

To calculate the average primary particle size Dp of the active material, observation using a scanning electron microscope (SEM) is preferably used together. That is, when the carbon body is removed from the active material by the heat treatment, as described above, the average primary particle size of the active material may change. It is therefore preferable that both the average primary particle size Dp obtained from the BET specific surface area S and the true density ρ and the average primary particle size calculated by the SEM observation are confirmed, and it is confirmed that the two values do not have a large difference.

If the two values do not have a difference, the average primary particle size Dp obtained from the BET specific surface area S and the true density ρ can be set as the average particle size of the primary particles of the active material. If the two values have a large difference, the average primary particle size calculated by the SEM observation is set as the average particle size of the primary particles of the active material.

The average primary particle size by the SEM observation can be calculated by the following method. First, in a primary particle of a SEM image obtained by the SEM observation, the length of the longest portion and the length of the shortest portion are measured, and the arithmetic mean value of these lengths is calculated as the primary particle size. The measurement of the primary particle size is done for 100 optionally selected particles, and the average value is set as the average primary particle size.

The primary particle of the active material according to the first embodiment includes a crystallite corresponding to the (020) plane. In the crystal structure of the monoclinic niobium-titanium composite oxide, the (020) plane direction, that is, the b-axis direction is one of the diffusion directions of lithium ions.

The crystallite size Dc of the (020) plane of the active material according to the first embodiment is preferably 120 nm or less, more preferably 90 nm or less, and much more preferably 85 nm or less. When the crystallite size Dc of the active material is small, it can be considered that the length in the b-axis direction is short in the crystal structure of the active material. When the length in the b-axis direction is short, the diffusion distance of lithium ions in the primary particles tends to be short, and therefore, the lithium ion diffusibility tends to rise.

On the other hand, if the crystallite size Dc of the active material is excessively small, the crystal structure of the monoclinic niobium-titanium composite oxide may become unstable. Hence, the crystallite size Dc of the active material is preferably 5 nm or more, and more preferably 10 nm or more.

The crystallite size Dc corresponding to the (020) plane of the active material can be calculated by a wide-angle X-ray diffraction method. More specifically, the active material particles are sufficiently pulverized to obtain a powder sample. The average particle size of the powder sample is preferably set to 20 μm or less. The average particle size can be obtained by a laser diffraction particle size distribution measuring apparatus.

Next, the powder sample is packed in the holder portion of a glass sample plate, and the surface is made flat. As the glass sample plate, for example, a glass sample plate whose holder portion has a depth of 0.2 mm can be used. Next, the glass sample plate is placed in a powder X-ray diffraction apparatus, and the XRD spectrum is measured using Cu-Kα rays. Detailed measurement conditions are, for example, as follows.

X-ray diffraction apparatus: SmartLab available from Rigaku
X-ray source: Cu-Kα rays
Output: 40 kV, 200 mA
Package measurement name: general-purpose measurement (concentration method)
Incident parallel slit opening angle: 5°
Incident longitudinal restriction slit length: 10 mm
Light-receiving PSA: absent
Light-receiving parallel slit opening angle: 5°
Monochromatization method: Kβ filtering method
Measurement mode: continuous
Incident slit width: 0.5°
Light-receiving slit width: 20 mm
Measurement range (2θ): 5° to 70°
Sampling width (2θ): 0.01°
Scan speed: 20°/min The XRD spectrum corresponding to the active material is thus obtained. In the XRD spectrum, the abscissa represents the incident angle (2θ), and the ordinate represents the diffraction intensity (cps).

Note that when an active material contained in the electrode of a battery is used as a sample, the XRD spectrum can be obtained by the following method. First, the battery is completely discharged. Next, the battery is disassembled in a glove box under an argon atmosphere, and the electrode is extracted. Next, the extracted electrode is washed using a solvent such as ethyl methyl carbonate. Then, the electrode after the washing is cut into almost the same area as the area of the holder of the glass sample plate to obtain a measurement sample.

Next, the obtained measurement sample is directly pasted to the glass holder, and XRD measurement is performed. Next, measurement is performed using the XRD for the materials of a current collector, a conductive agent, a binder, and the like other than the active material that can be contained in the electrode, thereby grasping the XRD pattern derived from the measurement values. Next, if there are overlapping peaks between a peak considered to be derived from the active material and the peaks of the remaining materials in the measurement sample, the peaks of the materials other than the active material are separated. The XRD spectrum concerning the active material is thus obtained.

Next, fitting processing is performed for the thus obtained XRD spectrum. In fitting, first, the background is removed from the XRD spectrum. Next, the peaks on the XRD spectrum are separated into Kα1 peaks and Kα2 peaks, and smoothing is performed. An XRD spectrum after the preprocessing is obtained in this way. Next, a peak search by a second derivative method is executed. Then, a peak profile formed from peaks selected by the peak search is subtracted from the XRD spectrum after the preprocessing, thereby obtaining a background profile. Fitting is performed for the thus obtained background profile using a polynomial. Next, using the peak profile and the information of background obtained by the above-described method, profile fitting by a least square method is executed for the XRD spectrum after the preprocessing. With this processing, variables of the peak information and the background information are optimized for the XRD spectrum after the preprocessing. Note that as the fitting function of the peak, a split pseudo-Voigt function is used. In addition, the fitting of the XRD spectrum can be performed by, for example, executing automatic profile processing using analysis software "Rigaku PDXL2 ver.2.1".

From the thus obtained XRD spectrum after the fitting processing, a full width at half maximum corresponding to the Kα1 peak of a peak P1 that appears within an incident angle range of 47.6° to 47.9° is obtained.

Next, the crystallite size Dc corresponding to the (020) plane is calculated using the thus obtained full width at half maximum corresponding to the Kα1 peak of the peak P1 and a Scherrer equation described below. Note that, in the Scherrer equation, K is the Scherrer constant, λ is the wavelength of Cu-Kα rays, βe is the full width at half maximum of the diffraction peak, and βo is the correction width of the full width at half maximum.

$$\text{Crystallite size(nm)} = \frac{K\lambda}{\beta \cos\theta}$$

$$\beta = \sqrt{\beta_e^2 - \beta_o^2}$$

Here, in the Scherrer equation, the Scherrer constant K is set to 0.94, the wavelength of the Cu-Kα rays is set to 0.15406 nm, and the correction value βo of the full width at half maximum is set to 0. Note that if the measuring system is different, the obtained value of the full width at half maximum may be different. In this case, the correct value of the crystallite size Dc can be obtained using the correction value βo of the full width at half maximum calculated using a standard sample.

In the active material according to the first embodiment, the ratio Dc/Dp of the crystallite size Dc to the average primary particle size Dp is 35% or more. When the ratio Dc/Dp is 35% or more, it can be considered that the diffusion path of lithium ions is sufficiently formed in the primary particles. Hence, the active material according to the first embodiment has excellent lithium ion diffusibility and high reactivity of lithium ions in the primary particles, and insertion and extraction of lithium ions are quickly performed. For this reason, the active material can implement a high reversible capacity. In addition, when the active material is used, the cycle characteristic of the battery can be improved. The ratio Dc/Dp is preferably 60% or more, and more preferably 80% or more. The upper limit value of the ratio Dc/Dp is 100% or less according to an example, and 98% or less according to another example.

The average secondary particle size of the active material according to the first embodiment is preferably 1 μm to 50 μm. When the average secondary particle size of the active material falls within this range, the productivity at the time of manufacture of the electrode can be improved, and a battery of satisfactory performance can be obtained. The average secondary particle size means a particle size with which a volume integrated value becomes 50% in a particle size distribution obtained by a laser diffraction particle size distribution measuring apparatus. As a sample used when performing the particle size distribution measurement, a dispersion obtained by diluting the active material by N-methyl-2-pyrrolidone such that the concentration becomes 0.1 mass % to 1 mass % is used.

The BET specific surface area of the active material according to the first embodiment is preferably 3.0 m$^2$/g to 120 m$^2$/g, and more preferably 4.0 m$^2$/g to 110 m$^2$/g. When an active material with a large specific surface area is used, the discharge rate characteristic of the battery can be improved. In addition, when an active material with a small specific surface area is used, the life characteristic of the battery can be improved, and in an electrode manufacturing step to be described later, the coating properties of a slurry containing the active material can be improved.

The active material according to the first embodiment can be a monoclinic niobium-titanium composite oxide represented by a general formula $Ti_{1-x}M1_xNb_{2-y}M2_yO_7$. In the general formula, $0 \leq x < 1$, and $0 \leq y < 1$ are set. The elements M1 and M2 are respectively at least one selected from the group consisting of V, Ta, Fe, Bi, Sb, As, P, Cr, Mo, W, B, Na, Mg, Al, and Si. The elements M1 and M2 may be the same element or may be elements different from each other.

As the element M1, it is preferable to use at least one element of Fe and Al. These elements are trivalent elements. Therefore, the use of these elements as the element M1 makes it possible to improve the electron conductivity of the monoclinic niobium-titanium composite oxide. Therefore, the use of these elements as the element M1 makes it possible to improve the capacity and rapid charge performance of the negative electrode.

From the viewpoint of improving electron conductivity, it is more preferable to use at least one element selected from the group consisting of V, Ta, Bi, Sb, As, and P as the element M1. Since these elements are pentavalent elements, the electron conductivity of the monoclinic niobium-titanium composite oxide can be further improved.

As the element M1, it is preferable to use at least one element selected from the group consisting of B, Na, Mg, and Si. The atomic weights of these elements are smaller than the atomic weight of Ti. Therefore, the use of these elements as the element M1 makes it possible to increase the capacity of the negative electrode.

As the element M2, it is preferable to use at least one element selected from the group consisting of Cr, Mo, and W. Since these elements are hexavalent elements, the electron conductivity of the monoclinic niobium-titanium composite oxide can be improved.

The use of Ta as the element M2 makes it possible to obtain a monoclinic niobium-titanium composite oxide having the same performance as that in the case of using Nb as the element M2. This is considered to be because Nb and Ta have the same physical, chemical, and electrical properties.

As the elements M1 and M2, at least one element selected from the group consisting of Mo, W, and V may be used. These elements exhibit an effect as a sintering auxiliary agent. Therefore, the use of these elements as at least one of M1 and M2 makes it possible to lower a firing temperature in producing the monoclinic niobium-titanium composite oxide.

The monoclinic niobium-titanium composite oxide can also be represented by the general formula $Ti_{1-x}M_xNb_2O_7$ ($0 \leq x < 1$). M in the general formula is the same as M1 described above.

The content of the elements M1 and M2 in the compound represented by the general formula $Ti_{1-x}M1_xNb_{2-y}M2_yO_7$ and the content of the element M in the compound represented by the general formula $Ti_{1-x}M_xNb_2O_7$ can be quantified, for example, by ICP spectroscopic analysis.

The monoclinic niobium-titanium composite oxide may contain an oxide having a composition which is beyond a stoichiometric ratio represented by the general formula $Ti_{1-x}M1_xNb_{2-y}M2_yO_7$ ($0 \leq x < 1$, $0 \leq y < 1$). The oxide can be represented by the general formula $Ti_{1-x}M1_xNb_{2-y}M2_yO_{7+\delta}$ ($0 \leq x < 1$, $0 \leq y < 1$, $-0.3 \leq \delta \leq 0.3$).

That is, during the preparation of the monoclinic niobium-titanium composite oxide, oxygen defects may occur in a raw material or an intermediate product. Inevitable impurities contained in the raw material as well as impurities mixed therein during the preparation may be present in the composite oxide. Due to the unavoidable factor, a monoclinic niobium-titanium composite oxide containing an oxide having a composition beyond a stoichiometric ratio may be prepared in some cases. The oxide having a composition beyond a stoichiometric ratio has excellent lithium ion insertion stability as with an oxide having a composition having a stoichiometric ratio. Therefore, even when the monoclinic niobium-titanium composite oxide contains the oxide having a composition beyond a stoichiometric ratio, the influence on the lithium ion insertion capacity is small.

The monoclinic niobium-titanium composite oxide may contain different phases with different Nb/Ti ratios. Examples of the different phases include Rutile type $TiO_2$, $Nb_{24}TiO_{62}$, $Nb_{14}TiO_{37}$, and $Nb_{10}Ti_2O_{29}$.

As the monoclinic niobium-titanium composite oxide, only one kind of monoclinic niobium-titanium composite oxide particles may be used, and mixtures of a plurality of kinds of monoclinic niobium-titanium composite oxides may be used.

In the Raman spectrum of the active material according to the first embodiment, the full width at half maximum of a peak P2 that appears within the Raman shift range of 970 $cm^{-1}$ to 1,010 $cm^{-1}$ is preferably 20 $cm^{-1}$ to 50 $cm^{-1}$, and more preferably 25 $cm^{-1}$ to 50 $cm^{-1}$. The peak P2 in the Raman spectrum of the active material according to the first embodiment is considered to be a peak derived from a niobium oxide ($NbO_6$) octahedron in the crystal structure of the monoclinic niobium-titanium composite oxide.

If the full width at half maximum of the peak P2 is 20 $cm^{-1}$ or more, the average primary particle size of the active material is thought to be sufficiently small. This is because if the primary particles of the active material have a nano-size, a phenomenon in which the peak on the Raman spectrum becomes broad is observed due to the phonon confinement effect. If the primary particle size of the active material is small, the diffusion distance of lithium ions tends to be short, and therefore, the reactivity between the active material and the lithium ions tends to increase. As a result, the lithium ion diffusibility of the active material rises, and the cycle characteristic of the battery can be improved.

On the other hand, if the full width at half maximum of the peak. P2 is larger than 50 $cm^{-1}$, this indicates that the primary particle size of the active material is too small, or the crystallinity of the active material is considerably low. If the primary particle size of the active material is excessively small, the reactivity between the active material and the electrolyte tends to rise, and the battery characteristic tends to lower. Additionally, if the crystallinity of the active material is excessively low, the diffusibility of lithium ions in the active material tends to lower.

Note that the active material according to the first embodiment can have a form of an active material composite material by including a carbon body, as will be described later. If an active material composite material is used as a measurement sample, oxygen defects in the particles of the monoclinic niobium-titanium composite oxide may affect the full width at half maximum of the peak P2. That is, the manufacturing step of the active material composite material includes calcination under a reducing atmosphere, as will be described later. At the time of calcination, the niobium element or titanium element may be partially reduced, and oxygen defects may be generated on the surfaces of the monoclinic niobium-titanium composite oxide particles. When the oxygen defects are generated on the surfaces of the monoclinic niobium-titanium composite oxide particles in this way, the full width at half maximum of the peak P2 tends to become large.

From the viewpoint of oxygen defects as well, the full width at half maximum of the peak P2 obtained for the active material composite material is preferably 50 $cm^{-1}$ or less. That is, if the oxygen effects are generated in the particles of the monoclinic niobium-titanium composite oxide, the electron conductivity tends to become high. However, if the oxygen defects are excessively generated, the crystal structure of the monoclinic niobium-titanium composite oxide undesirably becomes unstable. Hence, in the Raman spectrum concerning the active material composite material, if the full width at half maximum of the peak P2 is 20 $cm^{-1}$ to 50 $cm^{-1}$, it can be considered that the average primary particle size of the active material is sufficiently small, and oxygen defects are not excessively generated in the active material.

The Raman spectrum of the active material according to the first embodiment can be obtained by micro Raman spectroscopy using a light source with a wavelength of 532 nm. More specifically, first, an active material sample is prepared. When performing micro Raman spectroscopy for the active material contained in the electrode of a battery, first, the electrode after washing is obtained in accordance with the same procedure as described above. Next, the active material is collected from the electrode as a sample. Note that it is preferable that the presence/absence of Raman active of components such as a current collector, a conductive agent, and a binder other than the active material may be contained in the electrode and their peak positions are grasped before the micro Raman spectroscopy.

Next, micro Raman spectroscopy using a light source with a wavelength of 532 nm is performed for the active material sample. As a micro Raman spectrometer for example, LabRAM HR Evolution available from HORIBA Ltd. can be used. Measurement conditions are not particularly limited as long as the S/N ratio of the sample can sufficiently be lowered. As the measurement conditions, for example, the laser output is set to 50%, the slit size is set to 100 μm, the objective lens magnification is set to 10×, the grating is set to 600 gr/mm, the exposure time is set to 5 sec, and the integration count is set to 10. Note that in the measurement, it is preferable that calibration is performed in advance using silicon (Si) as a calibration sample, and the measurement is executed after it is confirmed that there is no shift of the optical axis system. The Raman spectrum of the active material according to the first embodiment is obtained in this way.

Next, for the measurement range of the thus obtained Raman spectrum, the background is approximated by a polynomial and fitted, and after that, subtraction processing is performed. Next, for all peaks included in the range, fitting is performed using Gauss and Lorentz functions to calculate the full width at half maximum. In this way, the full width at half maximum of the peak P2 that appears within the Raman shift range of 970 $cm^{-1}$ to 1,010 $cm^{-1}$ can be obtained.

Note that if a material other than the active material is contained in the sample, the peak of the active material and the peak of the material other than the active material may overlap. In such a case, the peak associated with the component other than the active material is preferably separated. In particular, when the active material has the form of an active material composite material including a carbon body, it is sometimes difficult to separate the peak concerning the carbon body and the peak concerning the conductive agent. In this case, the Raman spectrum of the active material composite material can be obtained by, for example, the following method. First, a sample collected from an electrode is washed by a solvent capable of dissolving the binder to remove the binder from the sample. Next, centrifugal separation is performed for the sample from which the binder is removed, thereby separating the active material composite material and the conductive agent. This is because the specific gravity of the active material composite material and that of the conductive agent are different. When the thus obtained sample is used, the Raman spectrum of the active material composite material that does not support the conductive agent but includes the carbon body can be obtained. Alternatively, separation of the conductive agent component and the active material composite material may be performed by mapping using micro Raman spectroscopy, and only the Raman spectrum corresponding to the active material composite material may be extracted.

As described above, the active material according to the first embodiment may include a carbon body in addition to the particles of the monoclinic niobium-titanium composite oxide. That is, the active material according to the first embodiment can be an active material composite material including a carbon body.

The carbon body covers at least a portion of the surface of each monoclinic niobium-titanium composite oxide particle. The carbon body preferably evenly covers the entire surfaces of the monoclinic niobium-titanium composite oxide particles. The carbon body may have a film shape or may have a particle shape.

The carbon body is a porous body that allows lithium ions and a nonaqueous solvent contained in a nonaqueous electrolyte to permeate. The electron conductivity of the carbon body is higher than the electron conductivity of the monoclinic niobium-titanium composite oxide particles. Hence, when the carbon body is supported, the electron conductivity of the active material can be increased.

The thickness of the carbon body is preferably 1 nm to 10 nm, and more preferably 2 nm to 10 nm. If the carbon body is excessively thick, diffusion of lithium ions tends to be impeded, and the internal resistance tends to rise. In addition, if the carbon body is excessively thin, the effect of raising the electron conductivity tends to be low.

The state and thickness of the carbon body can be confirmed with transmission electron microscopy (TEM) observation. Specifically, first, ruthenium is adsorbed on the surfaces of the active material composite material particles by an evaporation method. Then, the active material composite material particles are embedded in a resin, and the resin is thinned by ion milling using DualMill 600 manufactured by GATAN. Then, primary particles of arbitrary active material composite material particles are subjected to TEM observation. This observation allows the dispersibility of the carbon body on the active material composite material particles to be grasped. 10 or more particles are subjected to the observation, and the average value of the thickness of the carbon body is calculated as the thickness of the carbon body. As a TEM apparatus, for example, H-9000UHR III manufactured by Hitachi, Ltd. can be used. In this measurement, an accelerating voltage is set to 300 kV, and an image magnification is set to a 2000000-fold magnification.

The carbon body is preferably made of carbon with a low crystallinity. The carbon body may include a graphite-like crystal structure. The crystallinity of the carbon body can be grasped by micro Raman spectroscopy. That is, in the Raman spectrum of the active material composite material obtained by the above-described method, a ratio $I_G/I_D$ of a peak intensity $I_G$ of the G band and a peak intensity $I_D$ of the D band is preferably 1.2 or less, more preferably 1.1 or less, and much more preferably 1.0 or less.

Here, the G band is a peak found within the range of 1530 $cm^{-1}$ to 1630 $cm^{-1}$ on the Raman spectrum. The G band is derived from the graphite structure of the carbon body. The D band is a peak found within the range of 1280 $cm^{-1}$ to 1380 $cm^{-1}$ on the Raman spectrum. The D band is derived from the amorphous structure of the carbon body. On this Raman spectrum, a peak derived from the monoclinic niobium-titanium composite oxide particles does not substantially appear at the positions of the G band and D band.

Therefore, the low ratio $I_G/I_D$ of the active material composite material particles obtained by Raman spectrometry means that the crystallinity of the carbon body is low. The lower limit value of the ratio $I_G/I_D$ is not particularly limited, but it is, for example, 0.8 or more.

The manufacturing method of the active material according to the first embodiment will be described next.

First, an acid solution containing titanium and an acid solution containing niobium are mixed to prepare a solution mixture. An acid solution containing an arbitrary element may further be added to the acid solution mixture. As the acid solution containing titanium or niobium, for example, an acid solution obtained by dissolving a compound of each element in an aqueous solvent or alcohol solvent can be used. As the compound of each element, for example, a hydroxide, a sulfide, an oxide, a salt, or a mixture thereof can be used.

Next, an alkaline solution is added to the acid solution mixture to obtain a coprecipitation product. As the alkaline solution, for example, ammonia water can be used. The pH of the alkaline solution is, for example, 8 or more, or 12 or more. In addition, to obtain a fine coprecipitation product, the alkaline solution is preferably gradually added to the acid solution mixture.

Next, the solution containing the coprecipitation product is moved to an autoclave container, and subjected to a heat treatment. In the heat treatment, the heating temperature is preferably set to 160° C. to 200° C., and the heating time is preferably set to 5 hrs to 10 hrs. When the heat treatment is performed, a finer coprecipitation product can be obtained. Note that the heat treatment may be omitted or may be performed before the alkaline solution is added.

Next, the coprecipitation product is extracted and sufficient washed using pure water or the like. Then, the coprecipitation product after the washing is freeze-dried, thereby obtaining an active material precursor. The crystal structure of the thus obtained active material precursor is preferably an amorphous structure. When the active material precursor has an amorphous structure, reactivity in calcination can be raised. Note that the crystal structure of the active material precursor can be specified by X-ray diffraction.

Next, the active material precursor is subjected to calcination to obtain the active material. In the calcination, the active material precursor is preferably quickly heated in the air and calcined in a short time. More specifically, the temperature increase rate is preferably 100° C./min or more, and more preferably 500° C./min or more. In addition, the calcination temperature is preferably 700° C. to 1,100° C., and more preferably 750° C. to 1,000° C. The calcination time at the calcination temperature is preferably 1 min to 60 min, and more preferably 10 min 30 min. By calcining the active material precursor under these conditions, it is possible to obtain an active material in which the growth of the primary particles is suppressed, and the crystallite corresponding to the (020) plane sufficiently grows.

A method of manufacturing the above-described active material composite material including a carbon body will be described next.

First, a carbon source and pure water are mixed and sufficiently stirred to prepare a carbon source solution. As the carbon source, sugars such as sucrose, maltose and glucose, polyolefins, nitriles, alcohols such as polyvinyl alcohol (PVA), organic compounds containing a benzene ring, aromatic hydrocarbons such as pyrene, naphthalene and chrysene, or mixtures thereof can be used. As the carbon source, PVA is preferably used. The use of the PVA as the carbon source tends to provide an improvement in the dispersibility of the carbon body on the surfaces of the monoclinic niobium-titanium composite oxide particles.

Next, the carbon source solution and the active material particles obtained by the above-described method are mixed to prepare a dispersion. The amount of the carbon source relative to 100 parts by mass of active material is preferably 1 part by mass to 15 parts by mass, and more preferably 2 parts by mass to 10 parts by mass.

Next, the dispersion is subjected to spray drying to obtain a powder sample. Next, the obtained powder sample is further dried at a temperature of 70° C. to 200° C. for 1 min to 1 hr. Active material particles supporting an unfired carbon body are thus obtained.

Next, the active material particles supporting the unfired carbon body are subjected to calcination under an inert atmosphere, and carbonization is performed. As the gas for the inert atmosphere, for example, nitrogen has, carbon dioxide gas, argon gas, or the like can be used. The calcination time is, for example, 1 hr to 5 hrs. The calcination temperature is preferably 650° C. to 850° C., and more preferably 700° C. to 800° C. If the calcination temperature is high, the crystallinity of the carbon body tends to rise. The active material composite material can be obtained in this way.

According to the above-described first embodiment, an active material is provided. The active material includes particles. The particles has a crystal structure belonging to a monoclinic niobium-titanium composite oxide. The ratio of the crystallite size Dc corresponding to the (020) plane with respect to the average primary particle size Dp of the particles is 35% or more. Hence, the active material according to the first embodiment is excellent in charge-and-discharge cycle performance and can implement a high reversible capacity.

Second Embodiment

According to a second embodiment, an electrode is provided. The electrode according to the second embodiment includes the active material according to the first embodiment. The electrode according to the second embodiment can include the active material composite material. The electrode according to the second embodiment may be a battery electrode. The electrode according to the second embodiment can use as a negative electrode, for example.

The electrode according to the second embodiment can include a current collector and an active material-containing layer. The active material-containing layer can be formed on one surface or both of reverse surfaces of the current collector. The active material-containing layer can include an active material, and optionally a conductive agent and a binder.

The active material-containing layer can include one kind of the active material according to the first embodiment or two or more kinds of the active material according to the first embodiment. In addition, the active material-containing layer can include a mixture of one or more kinds of the active material according to the first embodiment and one or more kinds of other active materials.

For example, when the active material according to the first embodiment may be included as a negative active material, examples of the other active material include a lithium titanate having a ramsdellite structure (for example, $Li_{2+y}Ti_3O_7$ (0≤y≤3), a lithium titanate having a spinel structure (for example, $Li_{4+x}Ti_5O_{12}$ (0≤x≤3)), monoclinic titanium dioxide ($TiO_2$), anatase type titanium dioxide, rutile type titanium dioxide, a hollandite type titanium composite oxide, and an orthorhombic titanium composite oxide.

Examples of the orthorhombic titanium composite oxide includes a compound represented by a general formula of $Li_{2+a}M(I)_{2-b}Ti_{6-c}M(II)_dO_{14+\sigma}$. M(I) is at least one element selected from the group consisting of Sr, Ba, Ca, Mg, Na, Cs, Rb, and K. M(II) is at least one element selected from the group consisting of Zr, Sn, V, Nb, Ta, Mo, W, Y, Fe, Co, Cr, Mn, Ni, and Al. In the general formula, 0≤a≤6, 0≤b<<2, 0≤c<6, 0≤d<6, −0.5≤δ≤0.5. Specific examples of the orthorhombic titanium composite oxide include $Li_{2+a}Na_2Ti_6O_{14}$.

The conductive agent may be blended to improve current collection performance and to suppress the contact resistance between the negative electrode active material and the current collector. Examples of the conductive agent include vapor grown carbon fiber (VGCF), carbon black such as acetylene black, and carbonaceous materials such as graphite. One of these may be used as the conductive agent, or two or more thereof may be used in combination as the conductive agent. Alternatively, in place of using the conductive agent, a carbon coating or an electron conductive inorganic material coating may be applied to the surfaces of the negative electrode active material particles.

The binder may be blended to fill the gaps of the dispersed active material with the binder and also to bind the active material and the negative electrode current collector. Examples of the binder include polytetrafluoro ethylene (PTFE), polyvinylidene fluoride (PVdF), fluorine-containing rubber, styrene-butadiene rubber, a polyacrylic acid compound, an imide compound, carboxymethyl cellulose (CMC) and salts of the CMC. One of these may be used as the binder, or two or more thereof may be used in combination as the binder.

The content of the active material, the conductive agent, and the binder in the active material-containing layer may be appropriately changed depending on its application of the electrode. For example, if the electrode is used as the negative electrode of the secondary battery, it is preferable that the active material, the conductive agent, and the binder are respectively blended at rates of 68% by mass to 96% by mass, 2% by mass to 30% by mass, and 2% by mass to 30% by mass. The content of the conductive agent of 2% by mass or more makes it possible to improve the current collection performance of the active material-containing layer. The amount of the binder of 2% by mass or more provides sufficient binding property between the active material-containing layer and the current collector, which can provide promising excellent cycle performance. On the other hand, the contents of the conductive agent and binder are preferably 30% by mass or less, thereby increasing the capacity.

The current collector is a material which is electrochemically stable at the insertion and extraction potentials of lithium ions of the active material. For example, if the active material is used as the negative electrode active material, the current collector is preferably made of copper, nickel, stainless, aluminum, or an aluminum alloy containing one or more elements selected from Mg, Ti, Zn, Mn, Fe, Cu, and Si. The thickness of the current collector is preferably 5 μm to 20 μm. The current collector having such a thickness can achieve a balance between the strength and reduction in weight of the electrode.

The current collector can include a portion on one side where the negative electrode active material-containing layer is not carried on any surfaces. This portion acts as a negative electrode current collector tab.

The electrode may be produced by the following method, for example. First, an active material, a conductive agent, and a binder are suspended in a solvent to prepare a slurry. The slurry is applied onto one surface or both of reverse surfaces of a current collector. Next, the applied slurry is dried to form a layered stack of the active material-containing layer and the current collector. Then, the layered stack is subjected to pressing. The electrode can be produced in this manner.

Alternatively, the electrode may also be produced by the following method. First, an active material, an conductive agent, and a binder are mixed to obtain a mixture. Next, the mixture is formed into pellets. Then the electrode can be obtained by arranging the pellets on the current collector.

The electrode according to the second embodiment includes the active material according to the first embodiment. For this reason, the electrode according to the second embodiment can implement excellent charge-and-discharge cycle performance.

Third Embodiment

According to a third embodiment, an secondary battery including a negative electrode, a positive electrode and an electrolyte is provided. The secondary battery includes the electrode according to the second embodiment as the negative electrode.

The secondary battery according to the third embodiment can further include a separator disposed between the positive electrode and the negative electrode. The positive electrode, the negative electrode, and the separator can constitute an electrode group. The electrolyte may be held in the electrode group.

The secondary battery according to the third embodiment can further include a container member housing the electrode group and the electrolyte.

Furthermore, the secondary battery according to the third embodiment can further include a positive electrode terminal electrically connected to the positive electrode and a negative electrode terminal electrically connected to the negative electrode.

The secondary battery according to the third embodiment may be a lithium secondary battery. The secondary battery includes nonaqueous electrolyte secondary battery containing a nonaqueous electrolyte.

Hereinafter, the negative electrode, the positive electrode, the electrolyte, the separator, the container member, the positive electrode terminal, and the negative electrode terminal will be described in detail.

1) Negative Electrode

The negative electrode can include a negative electrode current collector and a negative electrode active material-containing layer. The negative electrode current collector and the negative electrode active material-containing layer can be the current collector and the active material-containing layer described concerning the electrode according to the second embodiment, respectively. The negative electrode active material-containing layer contains the active material according to the first embodiment as a negative electrode active material.

Of details of the negative electrode, a portion overlapping the details described in the second embodiment will be omitted.

The density of the negative electrode active material-containing layer (the current collector is not included) is preferably 1.8 g/cm$^3$ to 2.8 g/cm$^3$. The negative electrode in which the density of the negative electrode active material-containing layer falls within this range is excellent in the energy density and the electrolyte holding properties. The density of the negative electrode active material-containing layer is more preferably 2.1 g/cm$^3$ to 2.6 g/cm$^3$.

The negative electrode can be produced in accordance with, for example, the same procedure as that of the electrode according to the second embodiment.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may include one kind of positive electrode active material, or alternatively, include two or more kinds of positive electrode active materials. Examples of the oxide and sulfide include compounds capable of having Li (lithium) and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

More preferred examples of the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $LiNi_{1-y}Co_yO_2$; $0<x\leq1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When an room temperature molten salt is used as the nonaqueous electrolyte of the battery, preferred examples of the positive electrode active material include lithium iron phosphate, $Li_xVPO_4F$ ($0\leq x\leq1$), lithium manganese composite oxide, lithium nickel composite oxide, and lithium nickel cobalt composite oxide. Since these compounds have low reactivity with room temperature molten salts, cycle life can be improved. The room temperature molten salt will be described later in detail.

The primary particle size of the positive electrode active material is preferably within a range of from 100 nm to 1 µm. The positive electrode active material having a primary particle size of 100 nm or more is easy to handle during industrial production. In the positive electrode active material having a primary particle size of 1 µm or less, diffusion of lithium ions within solid can proceed smoothly.

The specific surface area of the positive electrode active material is preferably within a range of from 0.1 $m^2$/g to 10 $m^2$/g. The positive electrode active material having a specific surface area of 0.1 $m^2$/g or more can secure sufficient sites for inserting and extracting Li ions. The positive electrode active material having a specific surface area of 10 $m^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carbokymethyl cellulose (CMC), and salts of the CMC. One of these may be used as the binder, or two or more may be used in combination as the binder.

The conductive agent is added to improve a current collection performance and to suppress the contact resistance between the active material and the current collector. Examples of the conductive agent include vapor grown carbon fiber (VGCF), carbon black such as acetylene black, and carbonaceous substances such as graphite. One of these may be used as the conductive agent, or two or more may be used in combination as the conductive agent. The conductive agent may be omitted.

In the positive electrode active material-containing layer, the positive electrode active material and binder are preferably blended in proportions within ranges of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of insulator in the electrode is reduced, and thereby the internal resistance can be decreased.

When a conductive agent is added, the positive electrode active material, binder, and conductive agent are preferably blended in proportions of 77% by mass to 95% by mass, 2% by mass to 20% by mass, and 3% by mass to 15% by mass, respectively.

When the amount of the conductive agent is 3% by mass or more, the above-described effects can be expressed. By setting the amount of the conductive agent to 15% by mass or less, the proportion of conductive agent that contacts the electrolyte can be made low. When this proportion is low, the decomposition of a electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil is preferably within a range of from 5 µm to 20 µm, and more preferably 15 µm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector can include a portion on one side where the positive electrode active material-containing layer is not carried on any surfaces. This portion acts as a positive electrode current collector tab.

The positive electrode can be produced in accordance with, for example, the same procedure as that of the electrode according to the second embodiment.

3) Electrolyte

As the electrolyte, for example, a liquid nonaqueous electrolyte or a gel nonaqueous electrolyte may be used. The liquid nonaqueous electrolyte is prepared by dissolving an electrolyte salt in an organic solvent. The concentration of the electrolyte salt is preferably 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethansulfonate ($LiCF_3SO_3$), bistrifluoromethylsulfonylimide lithium (LiTFSI; $LiN(CF_3SO_2)_2$), and mixtures thereof. The electrolyte salt is preferably less likely to be oxidized even at high potentials, and $LiPF_6$ is most preferred.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel-like nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, the nonaqueous electrolyte may be, for example, an room temperature molten salt (ionic melt) including lithium ions, a polymer solid electrolyte, or an inorganic solid electrolyte, other than the liquid nonaqueous electrolyte or the gel nonaqueous electrolyte.

The electrolyte may be a aqueous electrolyte. The aqueous electrolyte contains an aqueous solvent and an electrolyte salt. The aqueous electrolyte may be a liquid. A liquid aqueous electrolyte is prepared by dissolving the electrolyte salt serving as a solute in the aqueous solvent. The electrolyte salt may be the same as the electrolyte salt described above.

As the aqueous solvent, a solution containing water can be used. Here the solution containing water may be pure water or a solvent mixture of water and an organic solvent.

The room temperature molten salt (ionic melt) means compounds which may exist in a liquid state at normal temperature (15 to 25° C.) among organic salts constituted of combinations of organic cations and anions. The room temperature molten salts include those which singly exist in a liquid state, those which are put into a liquid state when mixed with an electrolyte, those which are put into a liquid state when dissolved in an organic solvent, and mixture thereof. Generally, the melting point of the room temperature molten salt used in a secondary battery is 25° C. or less. Further, the organic cation generally has a quaternary ammonium skeleton.

The polymer solid electrolyte is prepared by dissolving the electrolyte salt in a polymeric material, and solidifying it.

The inorganic solid electrolyte is a solid substance having lithium ion conductivity.

4) separator

The separator may be made of, for example, a porous film or synthetic resin nonwoven fabric including polyethylene, polypropylene, cellulose, or polyvinylidene fluoride (PVdF). In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member can be properly selected depending on battery size or intended use of the battery.

6) Negative electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

7) Positive Electrode Terminal

The positive electrode terminal may be made of, for example, a material that is electrically stable in the potential range of 3 V to 4.5 V (vs. Li/Li$^+$) relative to the oxidation-and-reduction potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the third embodiment will be more specifically described with reference to the drawings.

Figure 4:
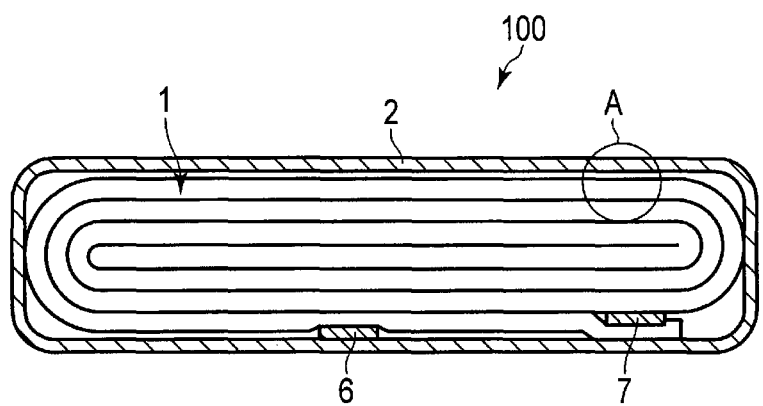
FIG. 4 is a cross-sectional view schematically showing an example of a secondary battery according to the third embodiment.
Figure 5:
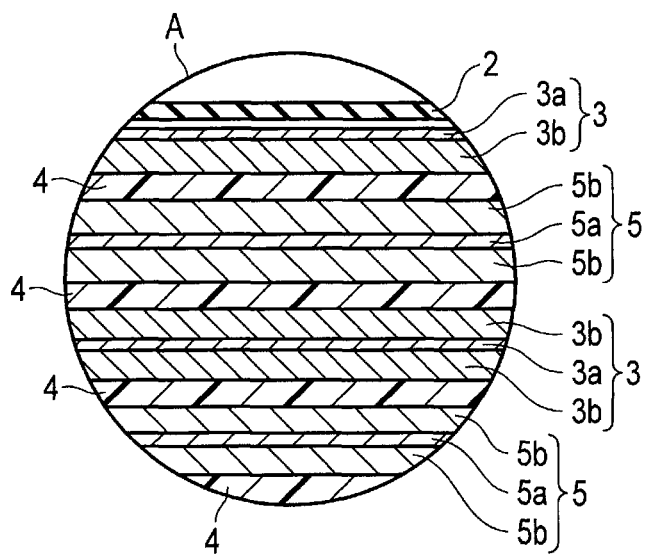
FIG. 5 is an enlarged cross-sectional view of section A of the secondary battery shown in FIG. 4.

FIG. 4 is a cross-sectional view schematically showing an example of a secondary battery according to the third embodiment. FIG. 5 is an enlarged cross-sectional view of section A of the secondary battery shown in FIG. 4.

The secondary battery 100 shown in FIGS. 4 and 5 includes a bag-shaped container member 2 shown in FIG. 4, an electrode group 1 shown in FIGS. 4 and 5, and an electrolyte, which is not shown. The electrode group 1 and the electrolyte are housed in the bag-shaped container member 2. The electrolyte (not shown) is held in the electrode group 1.

The bag shaped container member 2 is made of a laminate film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3a and a negative electrode active material-containing layer 3b. The active material according to the first embodiment is included in the negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 5. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 4, a negative electrode terminal 6 and positive electrode terminal 7 are positioned in vicinity of the outer peripheral edge of the wound electrode group 1. The negative electrode terminal 6 is connected to a portion of the negative electrode current collector 3a of the negative electrode 3 positioned outermost. The positive electrode terminal 7 is connected to the positive electrode current collector 5a of the positive electrode 5 positioned outermost. The negative electrode terminal 6 and the positive electrode terminal 7 extend out from an opening of the bag-shaped container member 2. The bag-shaped container member 2 is heat-sealed by a thermoplastic resin layer arranged on the interior thereof.

The secondary battery according to the third embodiment is not limited to the secondary battery of the structure shown in FIGS. 4 and 5, and may be, for example, a battery of a structure as shown in FIGS. 6 and 7.

FIG. 6 is a partially cut-out perspective view schematically showing another example of a secondary battery according to the third embodiment. FIG. 7 is an enlarged cross-sectional view of section B of the secondary battery shown in FIG. 6.

The secondary battery 100 shown in FIGS. 6 and 7 includes an electrode group 1 shown in FIGS. 6 and 7, a container member 2 shown in FIG. 6, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 7, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 7, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3 c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the third embodiment includes the electrode according to the second embodiment. For this reason, the secondary battery according to the third embodiment can implement excellent charge-and-discharge cycle performance.

Fourth Embodiment

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

FIG. 8 is a perspective view schematically showing an example of the battery module according to the fourth embodiment. A battery module 200 shown in FIG. 8 includes five single-batteries 100a to 100e, four bus bars 21, a positive electrode-side lead 22, and a negative electrode-side lead 23. Each of the five single-batteries 100a to 100e is a secondary battery according to the third embodiment.

For example, a bus bar 21 connects a negative electrode terminal 6 of one single-battery 100a and a positive electrode terminal 7 of the single-battery 100b positioned adjacent. The five single-batteries 100 are thus connected in series by the four bus bars 21. That is, the battery module 200 shown in FIG. 8 is a battery module of five in-series connection.

As shown in FIG. 8, the positive electrode terminal 7 of the single-battery 100a located at one end on the left among the row of the five single-batteries 100a to 100e is connected to the positive electrode-side lead 22 for external connection. In addition, the negative electrode terminal 6 of the single-battery 100e located at the other end on the right among the row of the five single-batteries 100a to 100e is connected to the negative electrode-side lead 23 for external connection.

The battery module according to the fourth embodiment includes the secondary battery according to the third embodiment. It is therefore possible to implement excellent charge-and-discharge cycle performance.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

FIG. 9 is an exploded perspective view schematically showing an example of the battery pack according to the fifth embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

A single-battery 100 has a structure shown in FIGS. 4 and 5. At least one of the plural single-batteries 100 is a secondary battery according to the third embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

A printed wiring board 34 is disposed on the one inner surface along the short-side direction of inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One main surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through-hole. By inserting the other end of the positive electrode-side lead 22 into the though-hole, the positive electrode-side connector 341 and the positive electrode-side lead 22 become electrically connected. The negative electrode-side connector 342 is provided with a through-hole. By inserting the other end of the negative electrode-side lead 23 into the though-hole, the negative electrode-side connector 342 and the negative electrode-side lead 23 become electrically connected.

The thermistor 343 is fixed to one main surface of the printed wiring board 34. The thermistor 343 detects the temperature of each single-battery 100 and transmits detection signals to the protective circuit 344.

The external power distribution terminal 347 is fixed to the other main surface of the printed wiring board 34. The external power distribution terminal 347 is electrically connected to device(s) that exists outside the battery pack 300.

The protective circuit 344 is fixed to the other main surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction, facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external devices, based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for vehicles. An example of the electronic device is a digital camera. The battery pack 300 is particularly favorably used as an onboard battery.

The battery pack according to the fifth embodiment includes the secondary battery according to the third embodiment or the battery module according to the fourth embodiment. Hence, the battery pack according to the fifth embodiment can implement excellent charge-and-discharge cycle performance.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle according to the sixth embodiment can include a mechanism configured to convert kinetic energy of the vehicle into regenerative energy.

Examples of the vehicle according to the sixth embodiment include two- to four-wheeled hybrid electric automobiles, two- to four-wheeled electric automobiles, electric assist bicycles, and railway cars.

In the vehicle according to the sixth embodiment, the installing position of the battery pack is not particularly limited. For example, the battery pack may be installed in the engine compartment of the vehicle, in rear parts of the vehicle, or under seats.

An example of the vehicle according to the sixth embodiment is explained below, with reference to the drawings.

FIG. 11 is a cross-sectional view schematically showing an example of a vehicle according to the sixth embodiment.

A vehicle 400, shown in FIG. 11 includes a vehicle body 40 and a battery pack 300 according to the fifth embodiment. In FIG. 11, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

An example is shown in FIG. 11, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

Next, with reference to FIG. 12, an aspect of operation of the vehicle according to the sixth embodiment is explained.

FIG. 12 is a view schematically showing another example of the vehicle according to the sixth embodiment. A vehicle 400, shown in FIG. 12, is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (for example, VTM: voltage temperature monitoring) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 12) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the sixth embodiment includes the battery pack according to the fifth embodiment. Hence, the vehicle according to the sixth embodiment can implement high running performance.

EXAMPLES

Examples of the present invention will be described below. However, the present invention is not limited to the examples to be described below.

Example 1

(Preparation of Active Material Particles AM1>

First, a diluted sulphuric acid solution containing titanyl sulfate and an ethanol solution containing niobium chloride were mixed to prepare an acid solution mixture. In the acid solution mixture, the mol ratio of titanium and niobium was 3:7. Next, ammonia water was gradually added to the acid solution mixture until the pH reached 8, thereby obtaining a coprecipitation product. Next, the solution containing the coprecipitation product was moved to an autoclave container and submitted for a heat treatment at a temperature of 160° C. for 5 hrs. Next, the coprecipitation product was extracted from the solution after the heat treatment and washed using pure water. Then, the coprecipitation product after the washing was freeze-dried to remove the solvent, thereby obtaining a powder of an active material precursor. When X-ray diffraction measurement was performed for the active material precursor, a halo peak was observed in the XRD pattern. That is, the crystal structure of the active material precursor was an amorphous structure.

Next, the active material precursor was placed in a heating furnace, heated from the room temperature up to a calcination temperature of 1,000° C. at a temperature increase rate of 500° C./min in the atmosphere, and calcined by maintaining the temperature for 1 min. Then, the heating furnace was cooled, thereby obtaining the active material particles AM1.

(Preparation of Active Material Composite Material Particles C-AM1)

Next, the active material particles AM1 obtained by the above-described method were made to support a carbon body, thereby obtaining an active material composite material particles C-AM1. More specifically, first, polyvinyl alcohol (PVA) and pure water were mixed to prepare a PVA solution. The concentration of PVA in the PVA solution was 15 mass. Then, the active material particles AM1 were added to the PVA solution and stirred to prepare a dispersion. Next, the dispersion was subjected to spray drying to obtain a powder sample. Next, the powder sample was further dried at a temperature of 100° C. for 12 hrs, thereby obtaining active material particles supporting an unfired carbon body. Next, the active material particles were carbonized under a reducing atmosphere at a temperature of 700° C. for 1 hr, thereby obtaining the active material composite material particles C-AM1.

(Production of Electrode)

An electrode was produced in the following way.

First, 100 parts by mass of active material, 6 parts by mass of conductive agent, and 4 parts by mass of binder were dispersed in a solvent to prepare a slurry. As the active material, the active material composite material particles C-AM1 obtained by the above-described method was used. As the conductive agent, a mixture of acetylene black and graphite was used. In the mixture, the mass ratio of acetylene black and graphite was 1:2. As the binder, a mixture of carboxymethyl cellulose (CMC) and styrene-butadiene rubber (SBR) was used. In the mixture, the mass ratio of CMC and SBR was 1:1. As the solvent, pure water was used.

Next, the obtained slurry was applied to one surface of a current collector, and the coating was dried, thereby forming an active material containing layer. As the current collector, an aluminum foil having a thickness of 12 μm was used. Then, the current collector and the active material containing layer were pressed to obtain an electrode. The weight of the electrode per unit area was 60 g/m².

(Preparation of Nonaqueous Electrolyte)

An electrolyte salt was dissolved in an organic solvent, thereby obtaining a liquid nonaqueous electrolyte. As the electrolyte salt, $LiPF_6$ was used. The mol concentration of $LiPF_6$ in the nonaqueous electrolyte was 1 mol/L. As the organic solvent, a solvent mixture of ethylene carbonate (EC) and diethyl carbonate (DEC) was used. The volume ratio of EC and DEC was 1:2.

(Preparation of Cell)

The electrode obtained by the above-described method was used as a working electrode, a metallic lithium foil was used as a counter electrode and a reference electrode, and the nonaqueous electrolyte prepared by the above-described method was used, thereby producing a three-electrode beaker cell.

Example 2

Active material particles AM2 were obtained in accordance with the same procedure as described in Example 1 except that for the calcination conditions of the active material precursor, the temperature increase rate was changed from 500° C./min to 100° C./min. Next, the active material particles AM2 were made to support a carbon body in accordance with the same procedure as described in Example 1, thereby obtaining active material composite material particles C-AM2. Then, a cell was produced in accordance with the same procedure as described in Example 1 except that the active material composite material particles C-AM2 were used in place of the active material composite material particles C-AM1.

Example 3

Active material particles AM3 were obtained in accordance with the same procedure as described in Example 1 except that for the calcination conditions of the active material precursor, the calcination temperature was changed from 1,000° C. to 900° C., and the calcination time was changed from 1 min to 10 min. Next, the active material particles AM3 were made to support a carbon body in accordance with the same procedure as described in Example 1, thereby obtaining active material composite material particles C-AM3. Then, a cell was produced in accordance with the same procedure as described in Example 1 except that the active material composite material particles C-AM3 were used in place of the active material composite material particles C-AM1.

Example 4

Active material particles AM4 were obtained in accordance with the same procedure as described in Example 1 except that for the calcination conditions of the active material precursor, the calcination temperature was changed from 1,000° C. to 800° C., and the calcination time was changed from 1 min to 30 min. Next, the active material particles AM4 were made to support a carbon body in accordance with the same procedure as described in Example 1, thereby obtaining active material composite material particles C-AM4. Then, a cell was produced in accordance with the same procedure as described in Example 1 except that the active material composite material particles C-AM4 were used in place of the active material composite material particles C-AM1.

Example 5

Active material particles AM5 were obtained in accordance with the same procedure as described in Example 1 except that for the calcination conditions of the active material precursor, the calcination time was changed from 1 min to 10 min. Next, the active material particles AM5 were made to support a carbon body in accordance with the same procedure as described in Example 1, thereby obtaining active material composite material particles C-AM5. Then, a cell was produced in accordance with the same procedure as described in Example 1 except that the active material composite material particles C-AM5 were used in place of the active material composite material particles C-AM1.

Example 6

Active material particles AM6 were obtained in accordance with the same procedure as described in Example 1 except that for the calcination conditions of the active material precursor, the calcination temperature was changed from 1,000° C. to 750° C., and the calcination time was changed from 1 min to 30 min. Next, the active material particles AM6 were made to support a carbon body in accordance with the same procedure as described in Example 1, thereby obtaining active material composite material particles C-AM6. Then, a cell was produced in accordance with the same procedure as described in Example 1 except that the active material composite material particles C-AM6 were used in place of the active material composite material particles C-AM1.

Example 7

Active material particles AM7 were obtained in accordance with the same procedure as described in Example 1 except that for the calcination conditions of the active material precursor, the calcination temperature was changed from 1,000° C. to 700° C. Next, the active material particles AM7 were made to support a carbon body in accordance with the same procedure as described in Example 1, thereby obtaining active material composite material particles C-AM7. Then, a cell was produced in accordance with the same procedure as described in Example 1 except that the active material composite material particles C-AM7 were used in place of the active material composite material particles C-AM1.

Comparative Example 8

(Preparation of Active Material Particles AM8>

First, a powder of titanium oxide and a powder of niobium hydroxide were measured such that the mol ratio became 1:1. Next, these powders and ethanol were mixed to obtain a mixture. Next, the mixture was placed in an electric furnace and heated in the atmosphere from room temperature up to a calcination temperature of 1,100° C. at a temperature increase rate of 20° C./min. After that, calcination was performed by maintaining the temperature for 720 min, thereby obtaining a powder sample. Next, the powder sample was naturally cooled and then pulverized using a planetary ball mill, thereby obtaining active material particles AM8.

Next, the active material particles AM8 were made to support a carbon body in accordance with the same procedure as described in Example 1, thereby obtaining active material composite material particles C-AM8. Then, a cell was produced in accordance with the same procedure as described in Example 1 except that the active material composite material particles C-AM8 were used in place of the active material composite material particles C-AM1.

Comparative Example 9

Active material particles AM9 were obtained in accordance with the same procedure as described in Comparative Example 8 except that for the calcination conditions of the mixture, the calcination temperature was changed from 1,100° C. to 1,000° C., and the calcination time was changed from 720 min to 60 min. Next, the active material particles AM9 were made to support a carbon body in accordance with the same procedure as described in Example 1, thereby obtaining active material composite material particles C-AM9. Then, a cell was produced in accordance with the same procedure as described in Example 1 except that the active material composite material particles C-AM9 were used in place of the active material composite material particles C-AM1.

<Evaluation Method>
(Icp Analysis)

ICP analysis was performed for the active material particles AM1 to AM9. As a result, all the active material particles AM1 to AM9 had the composition $Ti_{0.965}Nb_{2.035}O_7$.

(X-Ray Diffraction Measurement)

Wide-angle X-ray diffraction measurement was performed for the active material particles AM1 to AM9 by the above-described method. As a result, the active material particles AM1 to AM9 had the same crystal structure as that of the monoclinic niobium-titanium composite oxide $TiNb_2O_7$ of JCPDS #70-2009.

(Calculation of Crystallite Size Dc)

For the active material particles AM1 to AM9, the crystallite size Dc was calculated by the above-described method. The result is shown in Table 1.

Figure 13:
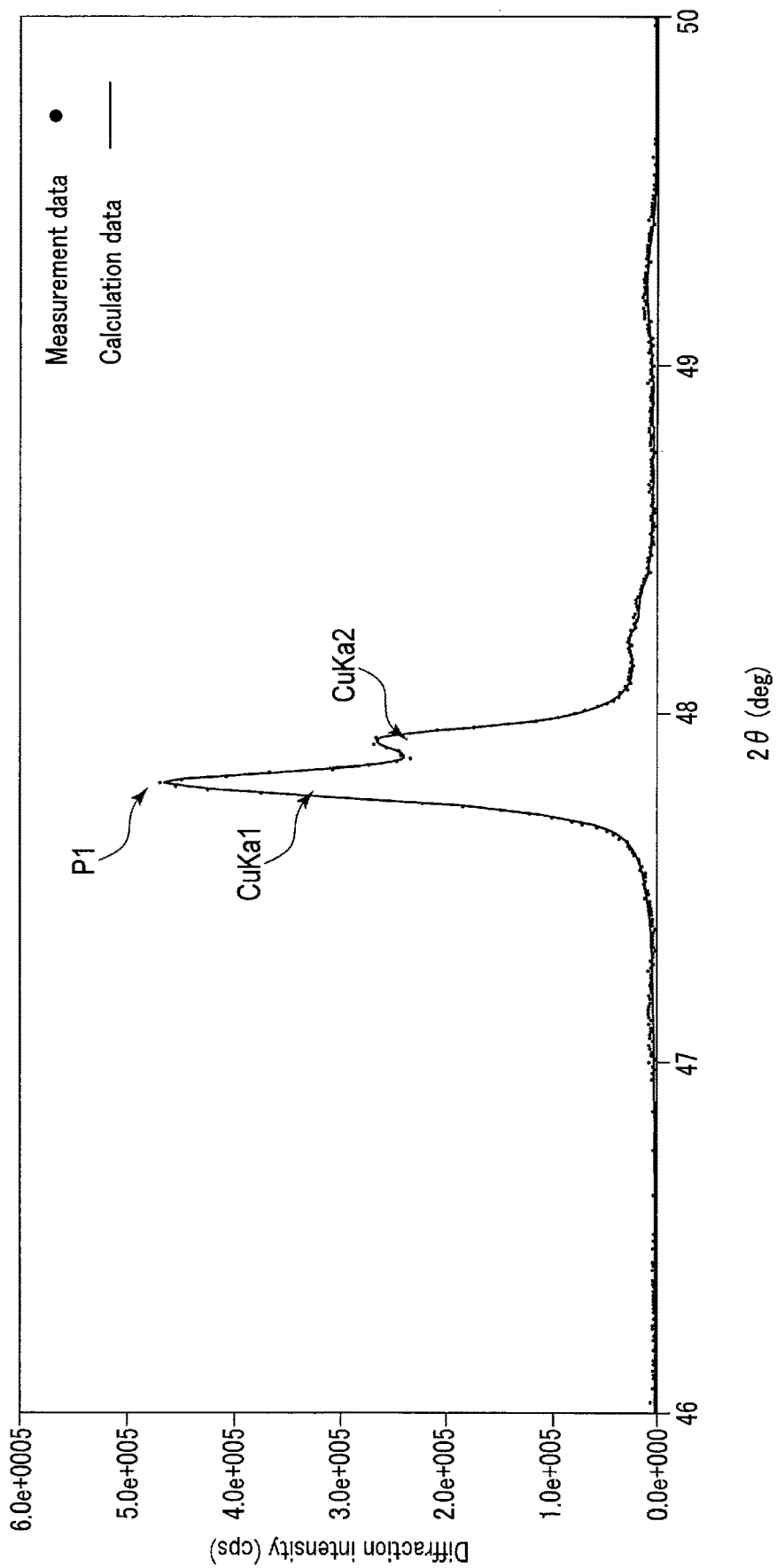
FIG. 13 is an XRD spectrum concerning the active material obtained in Example 1.
Figure 14:
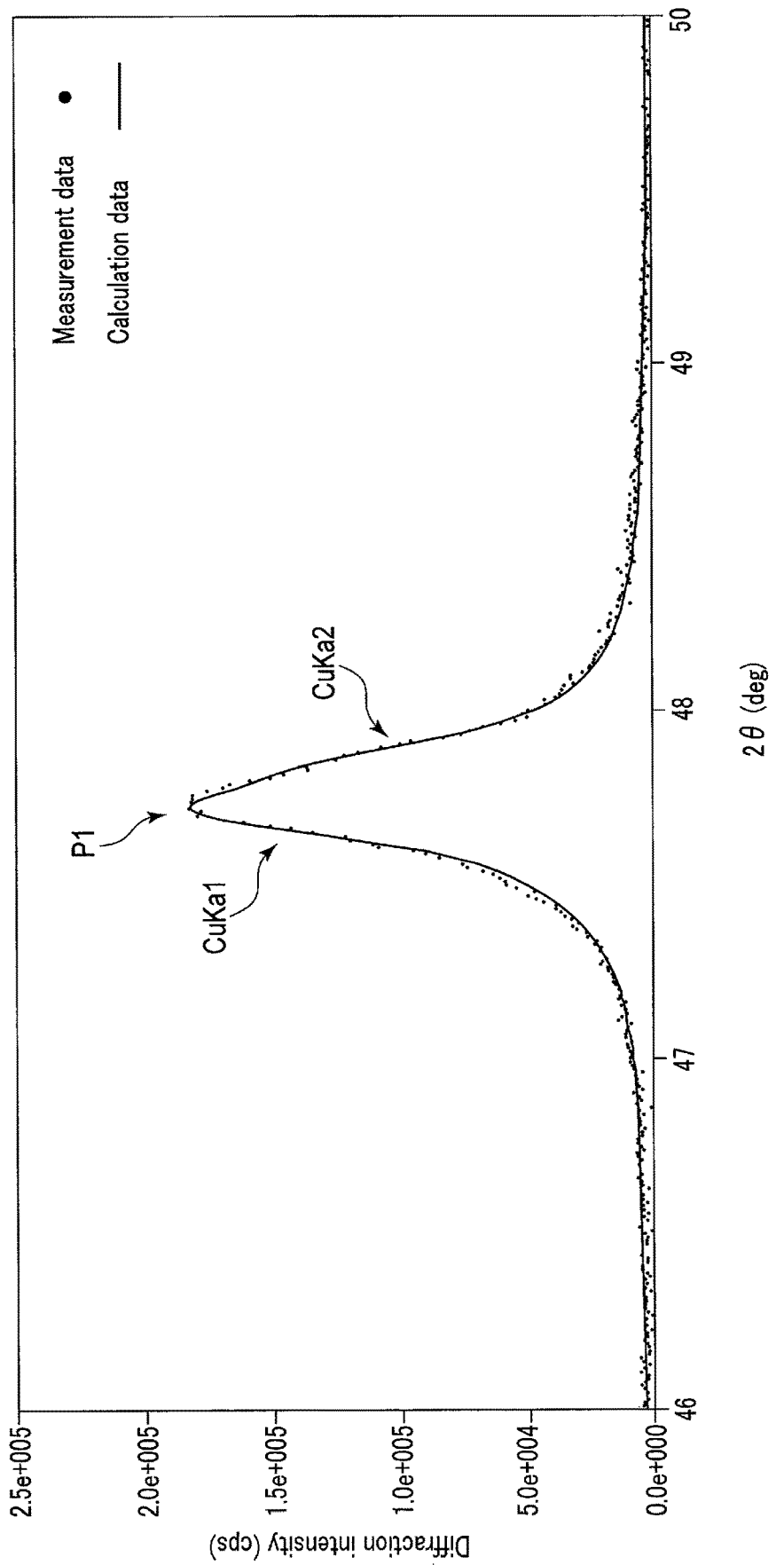
FIG. 14 is an XRD spectrum concerning the active material obtained in Example 4.

Here, FIG. 13 shows an XRD spectrum concerning the active material obtained in Example 1. In addition, FIG. 14 shows an XRD spectrum concerning the active material obtained in Example 4. Furthermore, FIG. 15 shows an XRD spectrum concerning the active material obtained in Comparative Example 8. FIGS. 13, 14, and 15 show the XRD spectra concerning the active material particles AM1, AM4, and AM8, respectively. In each of FIGS. 13, 14, and 15, the abscissa represents the incident angle, and the ordinate represents the diffraction intensity. In each of the spectra shown in FIGS. 13, 14, and 15, a peak P1 was detected within the incident angle range of 47.6° to 47.9°. In addition, the peak P1 could be separated into a Kα1 peak and a Kα2 peak.

(Measurement of BET Specific Surface Area)

For the active material particles AM1 to AM9, the BET specific surface area was calculated by the above-described method. The result is shown in Table 1.

(Calculation of Average Primary Particle Size Dp)

For the active material particles AM1 to AM9, the average primary particle size Dp was calculated by the above-described method. Note that to calculate the average primary particle size Dp, the BET specific surface area was used. The result is shown in Table 1.

(Micro Raman Spectroscopy)

For the active material composite material particles C-AM1 to C-AM9, micro Raman spectroscopy was performed to obtain a Raman spectrum. As a result, in all the Raman spectra, a G band and a D band were observed, and a ratio $I_G/I_D$ of a peak intensity $I_G$ of the G band and a peak intensity $I_D$ of the D band was 0.93.

Additionally, in each of these Raman spectra, the full width at half maximum of a peak P2 that appeared within the Raman shift range of 970 $cm^{-1}$ to 1,010 $cm^{-1}$ was measured. The result is shown in Table 1.

Figure 17:
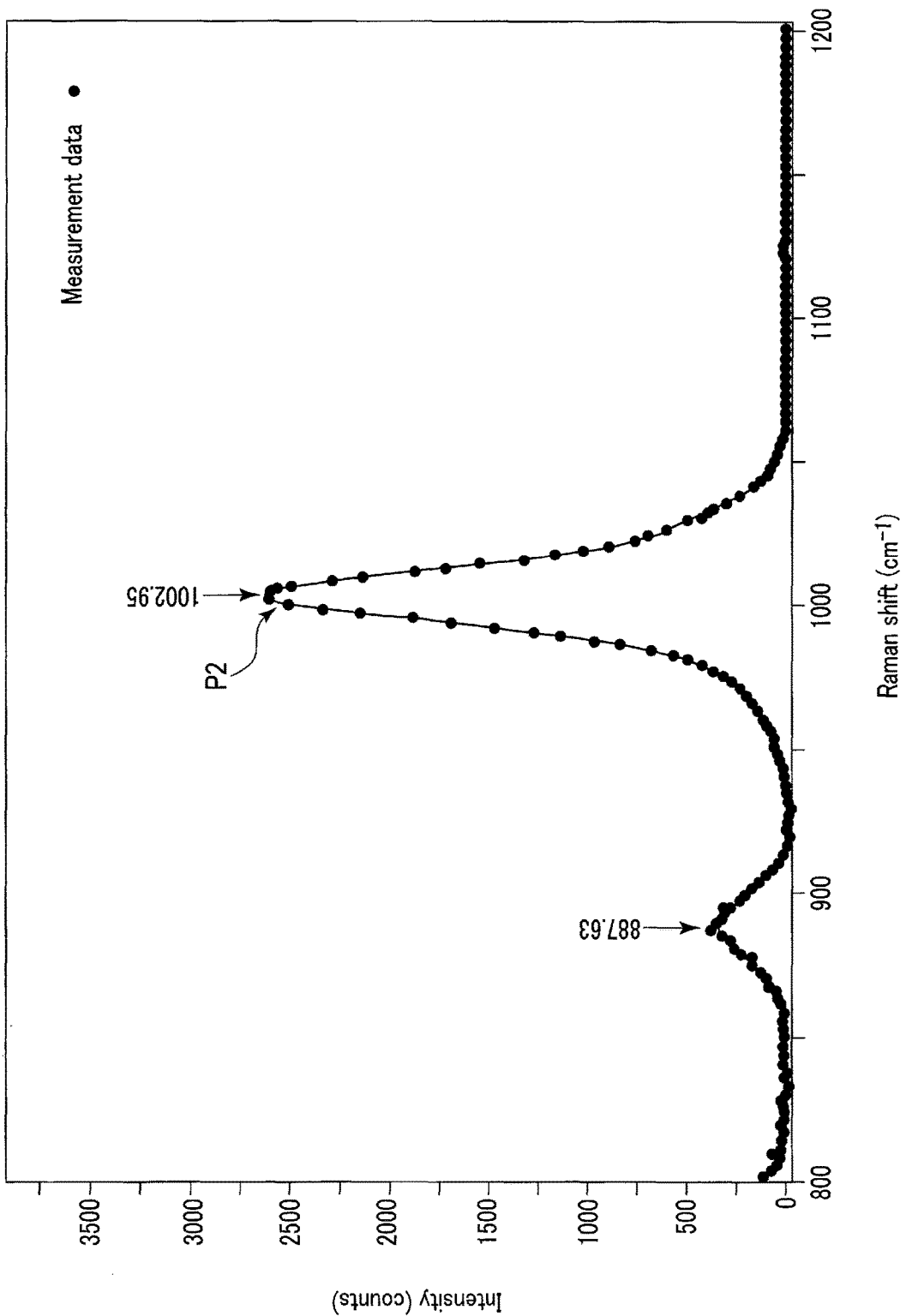
FIG. 17 is a Raman spectrum concerning the active material composite material obtained in Example 4.
Figure 18:
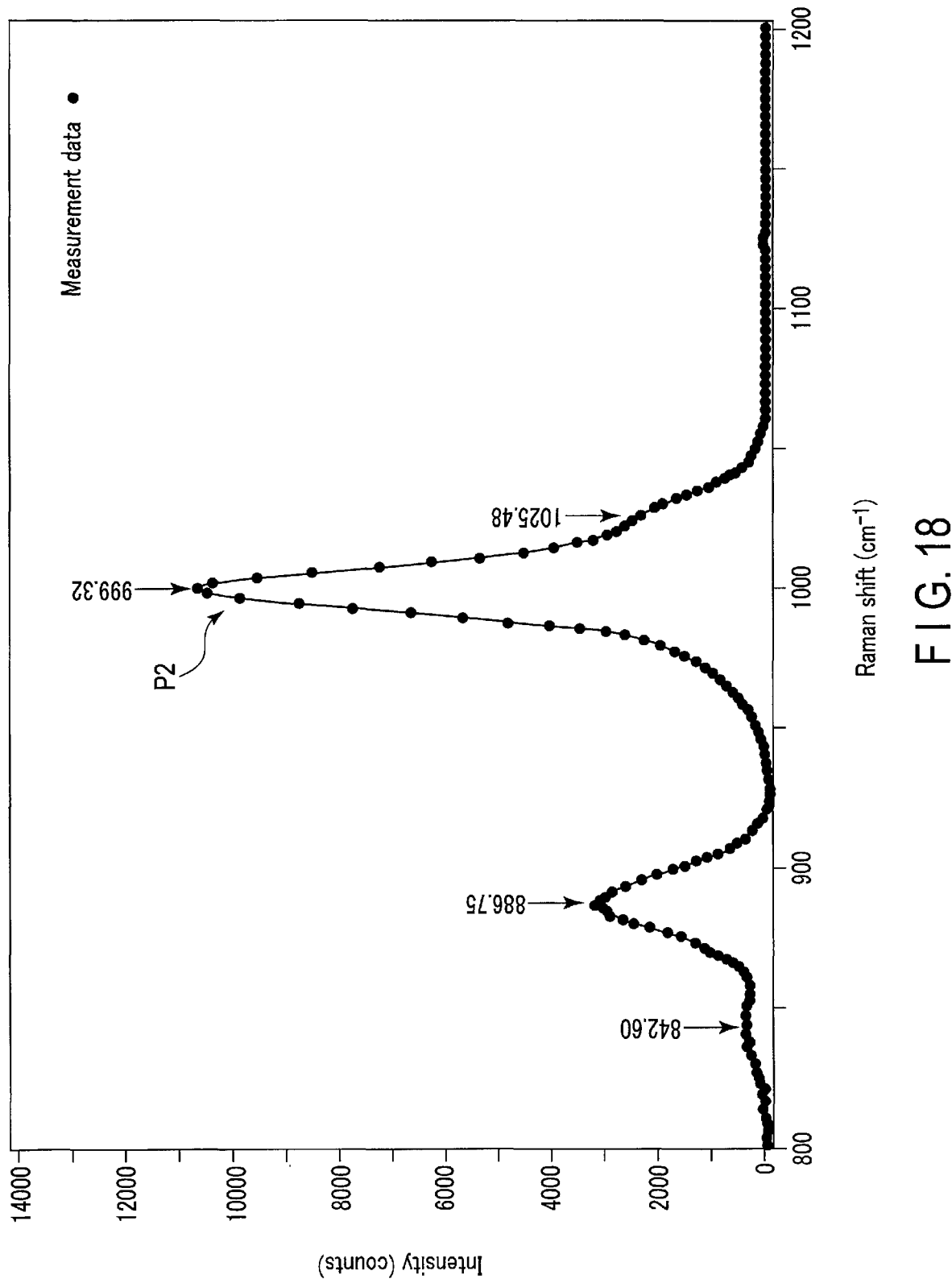
FIG. 18 is a Raman spectrum concerning the active material composite material obtained in Comparative Example 8.

Here, FIG. 16 shows a Raman spectrum concerning the active material composite material obtained in Example 1. In addition, FIG. 17 shows a Raman spectrum concerning the active material composite material obtained in Example 4. Furthermore, FIG. 18 shows a Raman spectrum concerning the active material composite material obtained in Comparative Example 8. FIGS. 16, 17, and 18 show the Raman spectra concerning the active material composite material particles C-AM1, C-AM4, and C-AM8, respectively. In each of FIGS. 16, 17, and 18, the abscissa represents the Raman shift, and the ordinate represents the scattering intensity. In the spectra shown in FIGS. 16, 17, and 18, the peaks P2 were detected at 1000.09 $cm^{-1}$, 1002.95 $cm^{-1}$, and 999.32 $cm^{-1}$. Additionally, in the peak P2 concerning the active material composite material particles C-AM4 shown in FIG. 17, a broad phenomenon of the peak caused by the phonon confinement effect was observed.

(Measurement of First Discharge Capacity and Cycle Characteristic Evaluation)

For each of the cells according to Examples 1 to 7 and Comparative Examples 8 and 9, the cycle characteristic was evaluated. More specifically, first, each cell was charged by a charge current of 0.2 C under a temperature of 25° C. until the battery voltage became 3.0 V. After that, the cell was discharged by a discharge current of 0.2 C until the battery voltage became 0.6 V. The discharge capacity at this time was measured as the initial discharge capacity.

Next, the cell after the discharge was charged by a charge current of 1 C under a temperature of 25° C. until the battery voltage became 3.0 V. After that, the cell was discharged by a discharge current of 1 C until the battery voltage became 0.6 V. In this way, a discharge capacity W1 in the first cycle was obtained. Next, defining the charge and discharge at 1 C as one cycle, the charge and discharge were repeated until the discharge capacity retention ratio to the discharge capacity W1 in the first cycle became 80%. The result is shown in Table 1.

Table 1 summarizes data according to Examples 1 to 7 and Comparative Examples 8 and 9.

TABLE 1

| | Manufacturing method | | | Active material | | | | | Battery characteristic | |
| | | | | Crystallite | Average primary | | BET specific | | First | |
| | Temperature increase rate (° C./min.) | Calcination temperature (° C.) | Calcination time (min.) | size Dc (nm) | particle size Dp (nm) | Dc/Dp | surface area ($m^2/g$) | FWHM of peak P2 ($cm^{-1}$) | discharge capacity (mAh/g) | Cycle characteristic (counts) |
|---|---|---|---|---|---|---|---|---|---|---|
| Example1 | 500 | 1000 | 1 | 87.4 | 147.1 | 59% | 9.4 | 20 | 341 | 200 |
| Example2 | 100 | 1000 | 1 | 113.7 | 320.6 | 35% | 4.3 | 19 | 330 | 200 |
| Example3 | 500 | 900 | 10 | 67.6 | 81.3 | 83% | 17.0 | 23 | 350 | 250 |
| Example4 | 500 | 800 | 30 | 39.9 | 41.1 | 97% | 33.6 | 28 | 355 | 260 |
| Example5 | 500 | 1000 | 10 | 81.4 | 135.2 | 60% | 10.2 | 21 | 343 | 210 |
| Example6 | 500 | 750 | 30 | 11.6 | 13.2 | 88% | 104.7 | 47 | 320 | 300 |
| Example7 | 500 | 799 | 1 | 8.5 | 11.6 | 73% | 119.2 | 51 | 303 | 250 |
| Comparative example8 | 20 | 1100 | 720 | 116.9 | 345.6 | 34% | 4.0 | 19 | 298 | 190 |
| Comparative example9 | 20 | 1000 | 60 | 106.7 | 340.9 | 31% | 4.1 | 20 | 302 | 190 |

Referring to Table 1, of columns under the heading "manufacturing method", a column with a notation "temperature increase rate (° C./min)" describes the temperature increase rate of each active material precursor in calcination processing. In addition, a column with a notation "calcination temperature (° C.)" describes the maximum reading temperature of the active material precursor in calcination processing. Furthermore, a column with a notation "calcination time (min)" describes the maintaining time of the active material precursor at the calcination temperature in calcination processing.

Additionally, of columns under the heading "active material", a column with a notation "crystallite size Dc (nm)" describes the crystallite size Dc of each active material obtained by the above-described method. In addition, a column with a notation "average primary particle size Dp (nm)" describes the average particle size of the primary particles of the active material obtained by the above-described method. Furthermore, a column with a notation "Dc/Dp" describes the ratio of the crystallite size Dc to the average primary particle size Dp. Moreover, a column with a notation "BET specific surface area ($m^2/g$)" describes the BET specific surface area of the active material obtained by the above-described method. Additionally, a column with a notation "FWHM of peak P2 ($cm^{-1}$)" describes the full width at half maximum of the peak P2 that appears within the Raman shift range of 970 $cm^{-1}$ to 1,010 $cm^{-1}$ in the Raman spectrum of the active material composite material obtained by the above-described method.

In addition, of columns under the heading "battery characteristic", a column with a notation "first discharge capacity (mAh/g)" describes the first discharge capacity of each cell obtained by the above-described test. In addition, a column with a notation "cycle characteristic (counts)" describes the cycle count when a capacity retention ratio of 80% obtained by the above-described cycle test was reached.

As shown in Table 1, the first discharge capacities of the cells according to Examples 1 to 7 in which the ratios Dc/Dp were 35% or more were higher than the first discharge capacities of the cells using the active materials according to Comparative Examples 8 and 9 in which the ratios Dc/Dp were lower than 35%.

In addition, as shown in Table 1, the first discharge capacities of the cells according to Examples 1, 3, and 6 in each of which the full width at half maximum of the peak P2 that appears within the Raman shift range of 970 $cm^{-1}$ to 1,010 $cm^{-1}$ was 20 $cm^{-1}$ to 50 $cm^{-1}$ were higher than the first discharge capacities and cycle characteristics of the cells according to Example 2 and Comparative Examples 8 and 9 in each of which the full width at half maximum of the peak P2 was smaller than 20 $cm^{-1}$. Furthermore, the first discharge capacities of the cells according to Examples 1, 3, and 6 were higher than the first discharge capacity of the cell according to Example 7 in which the full width at half maximum of the peak P2 was larger than 50 $cm^{-1}$.

According to at least one embodiment described above, an active material is provided. The active material includes particles. The particles have a crystal structure belonging to a monoclinic niobium-titanium composite oxide. The ratio of the crystallite size Dc corresponding to a (020) plane with respect to the average primary particle size Dp of the particles is 35% or more. Hence, the active material according to the first embodiment is excellent in charge-and-discharge cycle performance and can implement a high reversible capacity.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An active material comprising particles having a crystal structure belonging to a monoclinic niobium-titanium composite oxide,
   wherein a ratio of a crystallite size Dc corresponding to a (020) plane with respect to an average primary particle size Dp of the particles is not less than 35%.

2. The active material according to claim 1, wherein the ratio is 35% to 98%.

3. The active material according to claim 1, wherein the crystallite size Dc is 10 nm to 120 nm.

4. The active material according to claim 1, wherein the average primary particle size Dp is 10 nm to 350 nm.

5. An active material composite material comprising the active material according to claim 1, and a carbon body supported on at least a portion of surfaces of the particles.

6. The active material composite material according to claim 5, wherein in a Raman spectrum according to micro Raman spectroscopy using a light source with a wavelength of 532 nm, a full width at half maximum of a peak derived from a niobium oxide octahedron is 20 $cm^{-1}$ to 50 $cm^{-1}$, the peak appearing within a Raman shift range of 970 $cm^{-1}$ to 1,010 $cm^{-1}$.

7. The active material composite material according to claim 5, wherein a Raman spectrum according to micro Raman spectroscopy using a light source with a wavelength of 532 nm comprises a G band observed within a Raman shift range of 1,530 $cm^{-1}$ to 1,630 $cm^{-1}$ and a D band observed within a Raman shift range of 1,280 $cm^{-1}$ to 1,380 $cm^{-1}$, and a ratio $I_G/I_D$ of a peak intensity $I_G$ of the G band to a peak intensity $I_D$ of the D band is not more than 1.2.

8. An electrode comprising the active material according to claim 1.

9. A secondary battery comprising:
   the electrode according to claim 8 as a negative electrode;
   a positive electrode; and
   an electrolyte.

10. A battery pack comprising the secondary battery according to claim 9.

11. The battery pack according to claim 10, further comprising:
    an external power distribution terminal; and
    a protective circuit.

12. The battery pack according to claim 10,
    wherein:
    the battery pack includes plural of the secondary batteries; and
    the secondary batteries are electrically connected in series, in parallel, or in combination of series and parallel.

13. A vehicle comprising the battery pack according to claim 10.

14. The vehicle according to claim 13, which comprises a mechanism configured to convert kinetic energy of the vehicle into regenerative energy.

* * * * *